US012659268B2

(12) United States Patent
Zhang et al.

(10) Patent No.: US 12,659,268 B2
(45) Date of Patent: Jun. 16, 2026

(54) PATH DETERMINING METHOD, APPARATUS, DEVICE, AND SYSTEM, AND COMPUTER-READABLE STORAGE MEDIUM

(71) Applicant: Huawei Technologies Co., Ltd., Shenzhen (CN)

(72) Inventors: Jie Zhang, Beijing (CN); Xiaofei Wang, Beijing (CN); Xiaoxiao Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 185 days.

(21) Appl. No.: 18/419,995

(22) Filed: Jan. 23, 2024

(65) Prior Publication Data

US 2024/0205141 A1     Jun. 20, 2024

Related U.S. Application Data

(63) Continuation of application No. PCT/CN2022/107257, filed on Jul. 22, 2022.

(30) Foreign Application Priority Data

Jul. 26, 2021     (CN) .......................... 202110844837.4

(51) Int. Cl.
*H04L 45/302*         (2022.01)
*H04L 41/069*         (2022.01)
(Continued)

(52) U.S. Cl.
CPC .......... *H04L 45/302* (2013.01); *H04L 41/069* (2013.01); *H04L 43/0817* (2013.01)

(58) Field of Classification Search
CPC . H04L 45/302; H04L 41/069; H04L 43/0817; H04L 45/123; H04L 45/70; H04L 45/22; H04L 45/28
See application file for complete search history.

(56) References Cited

U.S. PATENT DOCUMENTS

2006/0153089 A1* 7/2006 Silverman ............... H04L 43/10
370/252
2018/0088809 A1 3/2018 Liu et al.
(Continued)

FOREIGN PATENT DOCUMENTS

CN        102123052 A      7/2011
CN        105007222 A      10/2015

OTHER PUBLICATIONS

Tong Xiao-wei "A Network Based Estimation Method of Business System," Journal of Chongqing University of Technology( Natural Science), Aug. 15, 2012, with English abstract, 6 pages.

*Primary Examiner* — Kamal M Hossain
(74) *Attorney, Agent, or Firm* — Conley Rose, P.C.

(57)         ABSTRACT

In a path determining method, a first device obtains a path health degree of a forwarding path from a source network element to a destination network element, where the path health degree is based on network element health degrees of network elements and link health degrees of links in the forwarding path, the network element health degree is based on a network element fault type and a network element fault occurrence frequency within a first monitoring periodicity, and the link health degree is based on a link fault type and a link fault occurrence frequency within a second monitoring periodicity; and determines a target forwarding path based on constraint information and the path health degree, where the constraint information includes health degree constraint information, and the health degree constraint information indicates a condition that a path health degree of the target forwarding path is to meet.

20 Claims, 7 Drawing Sheets

(51) Int. Cl.
 *H04L 43/0817*  (2022.01)
 *H04L 45/00*  (2022.01)
 *H04L 45/12*  (2022.01)
 *H04L 45/28*  (2022.01)

(56)    References Cited

U.S. PATENT DOCUMENTS

2018/0124677 A1*  5/2018  He ......................... H04W 40/34
2018/0367445 A1*  12/2018  Bajaj .................... H04L 41/142

* cited by examiner

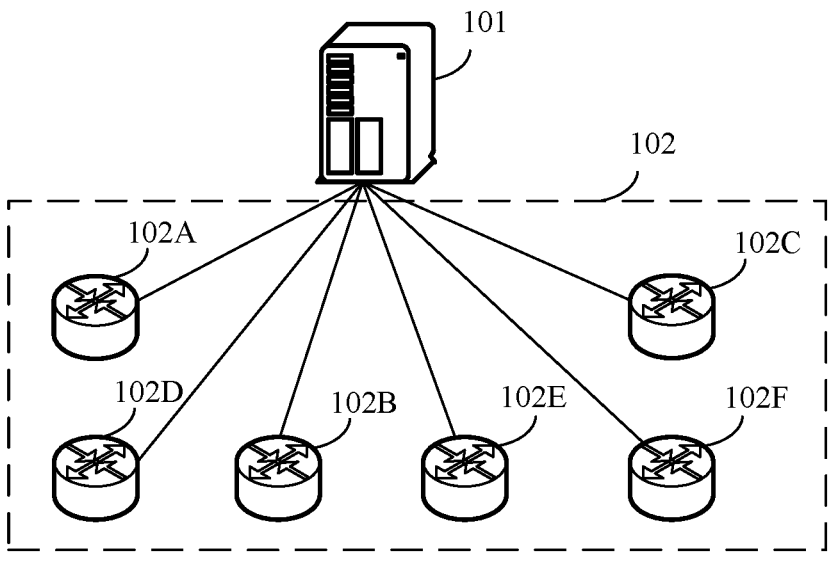

FIG. 1

| |
|---|
| Obtain a path health degree of a first candidate path, where the first candidate path is a forwarding path from a source network element to a destination network element, and the path health degree of the first candidate path is obtained based on network element health degrees of network elements included in the first candidate path and link health degrees of links included in the first candidate path |

201

| |
|---|
| Determine a target forwarding path based on constraint information and the path health degree of the first candidate path, where the constraint information includes health degree constraint information, the health degree constraint information indicates a condition that a path health degree of the target forwarding path needs to meet, and the path health degree of the target forwarding path indicates stability of the target forwarding path |

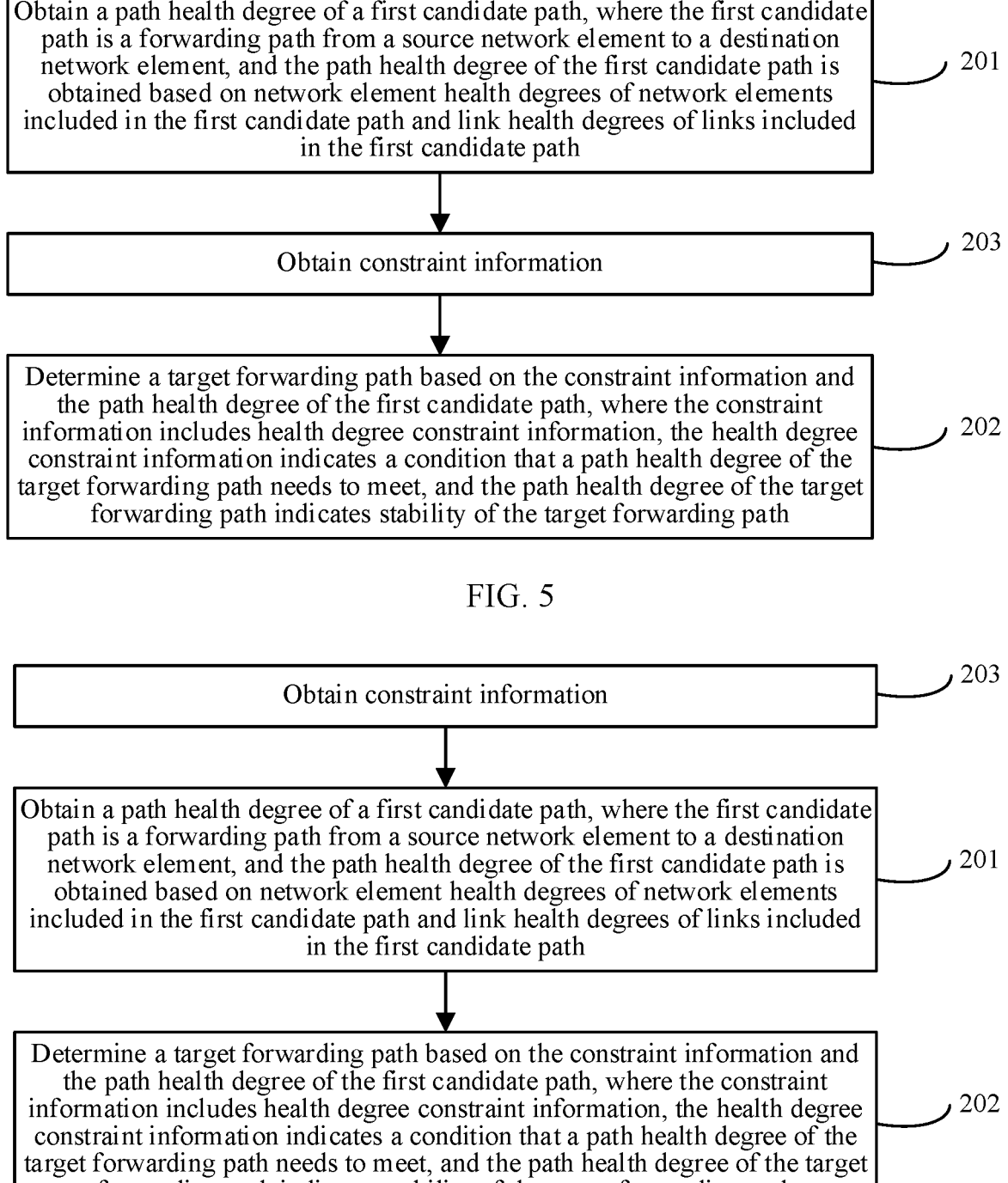

Obtain a path health degree of a first candidate path, where the first candidate path is a forwarding path from a source network element to a destination network element, and the path health degree of the first candidate path is obtained based on network element health degrees of network elements included in the first candidate path and link health degrees of links included in the first candidate path                                                                    201

Obtain constraint information                                                                    203

Determine a target forwarding path based on the constraint information and the path health degree of the first candidate path, where the constraint information includes health degree constraint information, the health degree constraint information indicates a condition that a path health degree of the target forwarding path needs to meet, and the path health degree of the target forwarding path indicates stability of the target forwarding path                                                                    202

FIG. 5

Obtain constraint information                                                                    203

Obtain a path health degree of a first candidate path, where the first candidate path is a forwarding path from a source network element to a destination network element, and the path health degree of the first candidate path is obtained based on network element health degrees of network elements included in the first candidate path and link health degrees of links included in the first candidate path                                                                    201

Determine a target forwarding path based on the constraint information and the path health degree of the first candidate path, where the constraint information includes health degree constraint information, the health degree constraint information indicates a condition that a path health degree of the target forwarding path needs to meet, and the path health degree of the target forwarding path indicates stability of the target forwarding path                                                                    202

FIG. 6

PATH DETERMINING METHOD, APPARATUS, DEVICE, AND SYSTEM, AND COMPUTER-READABLE STORAGE MEDIUM

CROSS-REFERENCE TO RELATED APPLICATIONS

This application is a continuation of International Patent Application No. PCT/CN2022/107257 filed on Jul. 22, 2022, which claims priority to Chinese Patent Application No. 202110844837.4 filed on Jul. 26, 2021. The disclosures of the aforementioned applications are hereby incorporated by reference in their entireties.

TECHNICAL FIELD

This application relates to the field of communication technologies, and in particular, to a path determining method, apparatus, device, and system, and a computer-readable storage medium.

BACKGROUND

When service transmission is performed in a communication network, a forwarding path of the service in the network needs to be determined, so that service data is forwarded from a source network element to a destination network element based on the determined forwarding path. In a related technology, the forwarding path from the source network element to the destination network element is determined based on bandwidth constraint information and delay constraint information.

However, when a link with a high fault probability exists in the forwarding path determined by using the foregoing path determining method, the forwarding path has poor stability and a high fault probability. Consequently, stability of performing service transmission based on the forwarding path is low.

SUMMARY

This application provides a path determining method, apparatus, device, and system, and a computer-readable storage medium, to determine a forwarding path with high stability, and ensure stable transmission of service data.

According to a first aspect, a path determining method is provided, where the method is applied to a first device, and the method includes obtaining a path health degree of a first candidate path, where the first candidate path is a forwarding path from a source network element to a destination network element, and the path health degree of the first candidate path is obtained based on network element health degrees of network elements included in the first candidate path and link health degrees of links included in the first candidate path, and the network element health degree is determined based on a network element fault type and a network element fault occurrence frequency within a first monitoring periodicity, and the link health degree is determined based on a link fault type and a link fault occurrence frequency within a second monitoring periodicity, and after the path health degree of the first candidate path is obtained, determining a target forwarding path based on constraint information and the path health degree of the first candidate path, where the constraint information includes health degree constraint information, the health degree constraint information indicates a condition that a path health degree of the target forwarding path needs to meet, and the path health degree of the target forwarding path indicates stability of the target forwarding path.

In the method, the path health degree of the forwarding path from the source network element to the destination network element is obtained, the target forwarding path whose path health degree meets the condition is further determined based on the health degree constraint information and the path health degree of the forwarding path, so that a forwarding path with high stability is determined, and stable transmission of service data is ensured. In addition, due to the high stability of the forwarding path, a probability of switching the forwarding path during the transmission of the service data is low, so that a probability of losing the service data during the path switching is reduced, thereby ensuring the stable transmission of the service data.

In a possible implementation, obtaining a path health degree of a first candidate path includes obtaining network element health data of the network elements in the first candidate path within the first monitoring periodicity, where the network element health data indicates network element fault information, obtaining link health data of the links in the first candidate path within the second monitoring periodicity, where the link health data indicates link fault information, obtaining the network element health degrees of the network elements based on the network element health data of the network elements, obtaining the link health degrees of the links based on the link health data of the links, and obtaining the path health degree of the first candidate path based on the network element health degrees of the network elements and the link health degrees of the links.

In a possible implementation, obtaining the network element health degrees of the network elements based on the network element health data of the network elements includes determining network element health degree impact factors of the network elements based on the network element health data of the network elements, and obtaining the network element health degrees of the network elements based on the network element health degree impact factors of the network elements. Obtaining the link health degrees of the links based on the link health data of the links includes determining link health degree impact factors of the links based on the link health data of the links, and obtaining the link health degrees of the links based on the link health degree impact factors of the links.

In a possible implementation, determining network element health degree impact factors of the network elements based on the network element health data of the network elements includes obtaining a network element fault type of a first network element and a network element fault occurrence frequency of the first network element based on network element health data of the first network element within the first monitoring periodicity, and determining network element health degree impact factors of the first network element based on the network element fault type of the first network element and the network element fault occurrence frequency of the first network element, where the first network element is any one of the network elements in the first candidate path. Determining link health degree impact factors of the links based on the link health data of the links includes obtaining a link fault type of a first link and a link fault occurrence frequency of the first link based on link health data of the first link within the second monitoring periodicity, and determining link health degree impact factors of the first link based on the link fault type of the first link and the link fault occurrence frequency of the first link, where the first link is any one of the links in the first candidate path.

In a possible implementation, obtaining the network element health degrees of the network elements based on the network element health degree impact factors of the network elements includes obtaining the network element health degrees of the network elements based on the network element health degree impact factors of the network elements and by using a first health degree algorithm. Obtaining the link health degrees of the links based on the link health degree impact factors of the links includes obtaining the link health degrees of the links based on the link health degree impact factors of the links and by using a second health degree algorithm.

In a possible implementation, obtaining the network element health degrees of the network elements based on the network element health degree impact factors of the network elements includes obtaining the network element health degrees of the network elements based on the network element health degree impact factors of the network elements and a first health degree model. Obtaining the link health degrees of the links based on the link health degree impact factors of the links includes obtaining the link health degrees of the links based on the link health degree impact factors of the links and a second health degree model.

Because the network element health degrees of the network elements may be obtained by using the first health degree algorithm, or may be obtained by using the first health degree model, a manner of obtaining the network element health degrees of the network elements in the method is flexible. Because the link health degrees of the links may be obtained by using the second health degree algorithm, or may be obtained by using the second health degree model, a manner of obtaining the link health degrees of the links in the method is flexible.

In a possible implementation, the first health degree model and the second health degree model are artificial intelligence (AI) models.

In a possible implementation, obtaining the network element health degrees of the network elements based on the network element health degree impact factors of the network elements and by using a first health degree algorithm includes obtaining a network element health degree statistical value based on health degree measurement results of the network element health degree impact factors of the first network element, and using the network element health degree statistical value as a network element health degree of the first network element. Obtaining the link health degrees of the links based on the link health degree impact factors of the links and by using a second health degree algorithm includes obtaining a link health degree statistical value based on health degree measurement results of the link health degree impact factors of the first link, and using the link health degree statistical value as a link health degree of the first link.

In a possible implementation, obtaining a network element health degree statistical value based on health degree measurement results of the network element health degree impact factors of the first network element includes accumulating the health degree measurement results of the network element health degree impact factors of the first network element to obtain the network element health degree statistical value. Obtaining a link health degree statistical value based on health degree measurement results of the link health degree impact factors of the first link includes accumulating the health degree measurement results of the link health degree impact factors of the first link to obtain the link health degree statistical value.

In a possible implementation, obtaining a network element health degree statistical value based on health degree measurement results of the network element health degree impact factors of the first network element includes accumulating products of the health degree measurement results of the network element health degree impact factors of the first network element and weights of the network element health degree impact factors, to obtain a first accumulation result, and using a difference between a first health degree reference value and the first accumulation result as the network element health degree statistical value. Obtaining a link health degree statistical value based on health degree measurement results of the link health degree impact factors of the first link includes accumulating products of the health degree measurement results of the link health degree impact factors of the first link and weights of the link health degree impact factors, to obtain a second accumulation result, and using a difference between a second health degree reference value and the second accumulation result as the link health degree statistical value.

In a possible implementation, the network element health data of the network elements is obtained based on at least one of alarms, logs, or key performance indicator (KPI) data of the network elements, and the link health data of the links is obtained based on at least one of alarms, logs, or KPI data of the links. Because the network element health data and the link health data can be obtained based on different records, manners of obtaining the network element health data and the link health data are flexible.

In a possible implementation, the network element health degree impact factors include a first fault type factor and a first fault probability factor, the link health degree impact factors include a second fault type factor and a second fault probability factor, the first fault probability factor includes at least one of accumulated fault duration, an accumulated fault quantity, or an average fault interval, and the second fault probability factor includes at least one of accumulated fault duration, an accumulated fault quantity, or an average fault interval.

In a possible implementation, obtaining the path health degree of the first candidate path based on the network element health degrees of the network elements and the link health degrees of the links includes using a health degree that is in the network element health degrees of the network elements and the link health degrees of the links and that meets a first condition as the path health degree of the first candidate path.

In a possible implementation, determining a target forwarding path based on constraint information and the path health degree of the first candidate path includes using the first candidate path as the target forwarding path if the path health degree of the first candidate path meets the health degree constraint information. The first candidate path whose path health degree meets the health degree constraint information is used as the target forwarding path, so that the forwarding path with high stability can be determined, and stable transmission of service data can be ensured.

In a possible implementation, after determining a target forwarding path, the method further includes sending the target forwarding path to a second device, where the target forwarding path is used by the second device to forward service data, or monitoring the path health degree of the target forwarding path, and updating the target forwarding path based on the health degree constraint information if the path health degree does not meet the health degree constraint information. In the method, the target forwarding path can be updated. Therefore, when stability of the original target forwarding path decreases, the target forwarding path may be updated, so that service data is transmitted based on an updated forwarding path, thereby ensuring stable transmission of the service data.

In a possible implementation, after determining a target forwarding path, the method further includes receiving a message for updating the forwarding path, where the message for updating the forwarding path indicates to update the target forwarding path. Because the message for updating the forwarding path indicates to update the target forwarding path, the first device can update the target forwarding path in response to the message for updating the forwarding path. In addition, an updated target forwarding path may be a forwarding path that has a high path health degree in the forwarding paths whose path health degrees meet the health degree constraint information. In this method, service data can be transmitted based on the forwarding path that has the high path health degree, and stability of transmitting the service data based on the forwarding path is high.

In a possible implementation, after determining a target forwarding path, the method further includes updating the target forwarding path based on a first time periodicity and the health degree constraint information. Because the target forwarding path is updated based on the first time periodicity, an updated target forwarding path may be a forwarding path that has a high path health degree in the forwarding paths whose path health degrees meet the health degree constraint information. In this method, service data can be transmitted based on the forwarding path that has the high path health degree, and stability of transmitting the service data based on the forwarding path is high.

In a possible implementation, after updating the target forwarding path, the method further includes switching from the target forwarding path before the update to an updated target forwarding path according to make before break (MBB). The path is switched according to the MBB, so that transmission of service data during the path switching can be ensured, and a loss of the service data can be avoided.

In a possible implementation, the constraint information further includes at least one of quality constraint information or cost constraint information, the quality constraint information is used to constrain quality of the determined forwarding path, and the cost constraint information is used to constrain a cost required for transmitting the service data through the determined forwarding path. Determining a target forwarding path based on constraint information and the path health degree of the first candidate path includes determining the target forwarding path based on the at least one of the quality constraint information or the cost constraint information, the health degree constraint information, and the path health degree of the first candidate path. In the method, the constraint information can include different types of constraint information. Therefore, the constraint information has high flexibility, and the forwarding path determined based on the constraint information better meets the service requirement.

According to a second aspect, a path determining method is provided, where the method is applied to a second device, and the method includes the following. The second device receives a target forwarding path from a source network element to a destination network element, where the target forwarding path is determined based on constraint information and a path health degree of a first candidate path, and the first candidate path is a forwarding path from the source network element to the destination network element, and the path health degree of the first candidate path is obtained based on network element health degrees of network elements included in the first candidate path and link health degrees of links included in the first candidate path, the network element health degree is determined based on a network element fault type and a network element fault occurrence frequency within a first monitoring periodicity, the link health degree is determined based on a link fault type and a link fault occurrence frequency within a second monitoring periodicity, the constraint information includes health degree constraint information, the health degree constraint information indicates a condition that a path health degree of the target forwarding path needs to meet, and the path health degree of the target forwarding path indicates stability of the target forwarding path. The second device forwards service data based on the target forwarding path.

In a possible implementation, after forwarding service data based on the target forwarding path, the method further includes receiving an updated target forwarding path, and forwarding the service data based on the updated target forwarding path.

According to a third aspect, a path determining apparatus is provided, where the apparatus is used in a first device, and the apparatus includes an obtaining module configured to obtain a path health degree of a first candidate path, where the first candidate path is a forwarding path from a source network element to a destination network element, and the path health degree of the first candidate path is obtained based on network element health degrees of network elements included in the first candidate path and link health degrees of links included in the first candidate path, and the network element health degree is determined based on a network element fault type and a network element fault occurrence frequency within a first monitoring periodicity, and the link health degree is determined based on a link fault type and a link fault occurrence frequency within a second monitoring periodicity, and a determining module configured to determine a target forwarding path based on constraint information and the path health degree of the first candidate path, where the constraint information includes health degree constraint information, the health degree constraint information indicates a condition that a path health degree of the target forwarding path needs to meet, and the path health degree of the target forwarding path indicates stability of the target forwarding path.

In a possible implementation, the obtaining module is configured to obtain network element health data of the network elements in the first candidate path within the first monitoring periodicity, where the network element health data indicates network element fault information, obtain link health data of the links in the first candidate path within the second monitoring periodicity, where the link health data indicates link fault information, obtain the network element health degrees of the network elements based on the network element health data of the network elements, obtain the link health degrees of the links based on the link health data of the links, and obtain the path health degree of the first candidate path based on the network element health degrees of the network elements and the link health degrees of the links.

In a possible implementation, the obtaining module is configured to determine network element health degree impact factors of the network elements based on the network element health data of the network elements, obtain the network element health degrees of the network elements based on the network element health degree impact factors of the network elements, determine link health degree impact factors of the links based on the link health data of the links, and obtain the link health degrees of the links based on the link health degree impact factors of the links.

In a possible implementation, the obtaining module is configured to obtain a network element fault type of a first network element and a network element fault occurrence frequency of the first network element based on network element health data of the first network element within the first monitoring periodicity, determine network element health degree impact factors of the first network element based on the network element fault type of the first network element and the network element fault occurrence frequency of the first network element, where the first network element is any one of the network elements in the first candidate path, obtain a link fault type of a first link and a link fault occurrence frequency of the first link based on link health data of the first link within the second monitoring periodicity, and determine link health degree impact factors of the first link based on the link fault type of the first link and the link fault occurrence frequency of the first link, where the first link is any one of the links in the first candidate path.

In a possible implementation, the obtaining module is configured to obtain the network element health degrees of the network elements based on the network element health degree impact factors of the network elements and by using a first health degree algorithm, and obtain the link health degrees of the links based on the link health degree impact factors of the links and by using a second health degree algorithm.

In a possible implementation, the obtaining module is configured to obtain the network element health degrees of the network elements based on the network element health degree impact factors of the network elements and a first health degree model, and obtain the link health degrees of the links based on the link health degree impact factors of the links and a second health degree model.

In a possible implementation, the first health degree model and the second health degree model are AI models.

In a possible implementation, the obtaining module is configured to obtain a network element health degree statistical value based on health degree measurement results of the network element health degree impact factors of the first network element, and use the network element health degree statistical value as a network element health degree of the first network element, and obtain a link health degree statistical value based on health degree measurement results of the link health degree impact factors of the first link, and use the link health degree statistical value as a link health degree of the first link.

In a possible implementation, the obtaining module is configured to accumulate the health degree measurement results of the network element health degree impact factors of the first network element to obtain the network element health degree statistical value, and accumulate the health degree measurement results of the link health degree impact factors of the first link to obtain the link health degree statistical value.

In a possible implementation, the obtaining module is configured to accumulate products of the health degree measurement results of the network element health degree impact factors of the first network element and weights of the network element health degree impact factors, to obtain a first accumulation result, use a difference between a first health degree reference value and the first accumulation result as the network element health degree statistical value, accumulate products of the health degree measurement results of the link health degree impact factors of the first link and weights of the link health degree impact factors, to obtain a second accumulation result, and use a difference between a second health degree reference value and the second accumulation result as the link health degree statistical value.

In a possible implementation, the network element health data of the network elements is obtained based on at least one of alarms, logs, or KPI data of the network elements, and the link health data of the links is obtained based on at least one of alarms, logs, or KPI data of the links. Because the network element health data and the link health data can be obtained based on different records, manners of obtaining the network element health data and the link health data are flexible.

In a possible implementation, the network element health degree impact factors include a first fault type factor and a first fault probability factor, the link health degree impact factors include a second fault type factor and a second fault probability factor, the first fault probability factor includes at least one of accumulated fault duration, an accumulated fault quantity, or an average fault interval, and the second fault probability factor includes at least one of accumulated fault duration, an accumulated fault quantity, or an average fault interval.

In a possible implementation, the obtaining module is configured to use a health degree that is in the network element health degrees of the network elements and the link health degrees of the links and that meets a first condition as the path health degree of the first candidate path.

In a possible implementation, the determining module is configured to use the first candidate path as the target forwarding path if the path health degree of the first candidate path meets the health degree constraint information.

In a possible implementation, the apparatus further includes a sending module configured to send the target forwarding path to a second device, where the target forwarding path is used by the second device to forward service data, or a first updating module configured to monitor the path health degree of the target forwarding path, and update the target forwarding path based on the health degree constraint information if the path health degree does not meet the health degree constraint information.

In a possible implementation, the apparatus further includes a second updating module configured to receive a message for updating the forwarding path, where the message for updating the forwarding path indicates to update the target forwarding path.

In a possible implementation, the apparatus further includes a third updating module configured to update the target forwarding path based on a first time periodicity and the health degree constraint information.

In a possible implementation, the apparatus further includes a switching module configured to switch from the target forwarding path before the update to an updated target forwarding path according to MBB.

In a possible implementation, the constraint information further includes at least one of quality constraint information or cost constraint information, the quality constraint information is used to constrain quality of the determined forwarding path, and the cost constraint information is used to constrain a cost required for transmitting the service data through the determined forwarding path. The determining module is configured to determine the target forwarding path based on the at least one of the quality constraint information or the cost constraint information, the health degree constraint information, and the path health degree of the first candidate path.

According to a fourth aspect, a path determining apparatus is provided, where the apparatus is used in a second device, and the apparatus includes a receiving module configured to receive a target forwarding path from a source network element to a destination network element, where the target forwarding path is determined based on constraint information and a path health degree of a first candidate path, and the first candidate path is a forwarding path from the source network element to the destination network element, and the path health degree of the first candidate path is obtained based on network element health degrees of network elements included in the first candidate path and link health degrees of links included in the first candidate path, the network element health degree is determined based on a network element fault type and a network element fault occurrence frequency within a first monitoring periodicity, the link health degree is determined based on a link fault type and a link fault occurrence frequency within a second monitoring periodicity, the constraint information includes health degree constraint information, the health degree constraint information indicates a condition that a path health degree of the target forwarding path needs to meet, and the path health degree of the target forwarding path indicates stability of the target forwarding path, and a sending module configured to forward service data based on the target forwarding path.

In a possible implementation, the apparatus further includes an updating module configured to receive an updated target forwarding path, and forward the service data based on the updated target forwarding path.

According to a fifth aspect, a path determining device is provided, where the path determining device includes a processor, where the processor is coupled to a memory, the memory stores at least one program instruction or code, and the at least one program instruction or code is loaded and executed by the processor, so that the path determining device implements the path determining method according to any one of the first aspect or the second aspect.

According to a sixth aspect, a path determining system is provided, where the path determining system includes a first device and a second device, where the first device is configured to perform the path determining method according to any one of the first aspect or the first aspect, and the second device is configured to perform the path determining method according to any one of the second aspect or the second aspect.

According to a seventh aspect, a computer-readable storage medium is provided. The computer-readable storage medium stores at least one program instruction or code, and when the program instruction or the code is loaded and executed by a processor, a computer is enabled to implement the path determining method according to any one of the first aspect or the second aspect.

According to an eighth aspect, a computer program product is provided, including a computer program, where when the computer program is executed by a computer, the computer is enabled to implement the path determining method according to any one of the first aspect or the second aspect.

According to a ninth aspect, a communication apparatus is provided, where the apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform the method in any one of the first aspect or the possible implementations of the first aspect, or perform the method in any one of the second aspect or the possible implementations of the second aspect.

In a possible implementation, there are one or more processors, and there are one or more memories.

In a possible implementation, the memory may be integrated with the processor, or the memory and the processor are disposed separately.

During specific implementation, the memory may be a non-transitory memory, such as a read-only memory (ROM). The memory and the processor may be integrated on one chip, or may be separately disposed in different chips. A type of the memory and a manner in which the memory and the processor are disposed are not limited in this application.

According to a tenth aspect, a chip is provided, including a processor configured to invoke, from a memory, instructions stored in the memory and run the instructions, so that a communication device in which the chip is installed performs the method in any one of the first aspect or the possible implementations of the first aspect, or performs the method in any one of the second aspect or the possible implementations of the second aspect.

According to an eleventh aspect, another chip is provided, including an input interface, an output interface, a processor, and a memory. The input interface, the output interface, the processor, and the memory are connected through an internal connection path. The processor is configured to execute code in the memory, and when the code is executed, the processor is configured to perform the method in any one of the first aspect or the possible implementations of the first aspect, or perform the method in any one of the second aspect or the possible implementations of the second aspect.

BRIEF DESCRIPTION OF DRAWINGS

FIG. 1 is a schematic diagram of an implementation scenario of a path determining method according to an embodiment of this application;

FIG. 2 is a flowchart of a path determining method according to an embodiment of this application;

FIG. 5 is a flowchart of a path determining method according to an embodiment of this application;

FIG. 6 is a flowchart of another path determining method according to an embodiment of this application;

DESCRIPTION OF EMBODIMENTS

Figure 3:
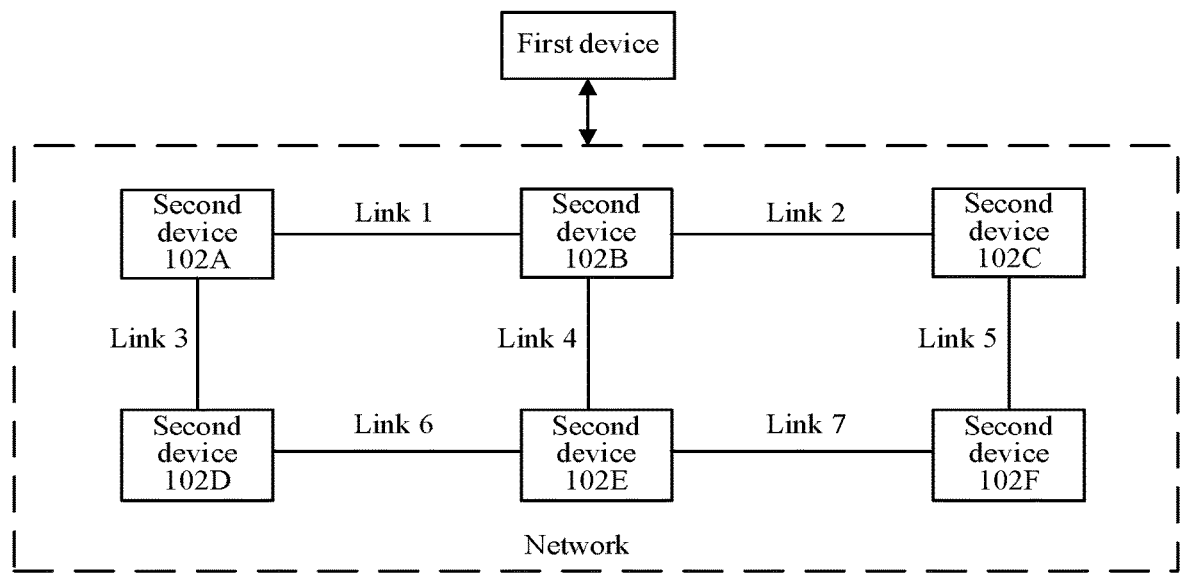
FIG. 3 is a schematic diagram of an obtained first candidate path according to an embodiment of this application.

To make objectives, technical solutions, and advantages of this application clearer, the following further describes the implementations of this application in detail with reference to the accompanying drawings.

In an Internet Protocol (IP) network, a forwarding path on a network layer needs to be determined, to transmit service data from a sender (a source network element) to a receiver (a destination network element). Stability of the forwarding path is an important factor that affects stability of forwarding the service data along the forwarding path. Higher stability of the forwarding path indicates a lower probability that the forwarding path is faulty, and higher stability of forwarding the service data along the forwarding path. Lower stability of the forwarding path indicates a higher probability that the forwarding path is faulty, and lower stability of forwarding the service data along the forwarding path.

An embodiment of this application provides a path determining method. In the method, a path health degree of a forwarding path from a source network element to a destination network element is obtained, so that a target forwarding path that meets constraint information is determined based on the constraint information including health degree constraint information and the path health degree of the forwarding path, thereby improving stability of the determined forwarding path. The forwarding path includes a plurality of network elements and links between the plurality of network elements, where the link is a link between two adjacent network elements. The plurality of network elements and the links between the plurality of network elements each have corresponding health degrees, where a network element health degree of the network element indicates stability of the network element, a link health degree of the link indicates stability of the link, and the path health degree indicates the stability of the path. For example, a path health degree of the target forwarding path indicates stability of the target forwarding path. The network element health degree is determined based on a health status, a fault type, a fault occurrence frequency, and the like of a device or software on the network element, for example, an abnormal alarm status of a board, an abnormal alarm status of a subcard, stability of a device temperature, stability of a device voltage, an abnormal alarm status of the software, and a packet loss status of a forwarding engine. The link health degree is determined based on a cyclic redundancy check (CRC) status of the link, an Ethernet port connection lost (ETH-LOS) alarm status, a queue packet loss status on the link, a historical flapping status of the link, and the like. The historical flapping status includes but is not limited to a flapping frequency and a flapping interval. It should be noted that, if a link is not faulty in a current status and a historical status, a link health degree of the link inherits a network element health degree of a network element connected to the link. For example, that a link health degree of the link inherits a network element health degree of a network element connected to the link includes that the link health degree of the link is equal to the network element health degree of the network element in an inbound direction connected to the link. For example, a link A is a link between a network element 1 and a network element 2, where the network element 1 and the network element 2 are two adjacent network elements, and the network element 1 is a network element in an inbound direction. That is, service data is sent from the network element 1 to the network element 2. If the link A is not faulty in both the current status and the historical status, a link health degree of the link is equal to a network element health degree of the network element 1. Certainly, if the link is not faulty in both the current status and the historical status, the link health degree of the link may alternatively be a smaller value of network element health degrees of the two network elements connected to the link, or an average value of network element health degrees of the two network elements.

The method provided in this embodiment of this application may be applied to an implementation scenario shown in FIG. 1. The implementation scenario includes a first device 101 and second devices 102A to 102F (collectively referred to as second devices 102), and information can be exchanged between the first device 101 and the second devices 102.

For example, the first device 101 includes but is not limited to a controller, an analyzer, or a network device. For example, the first device 101 is a software-defined networking (SDN) controller. The second device 102 includes a plurality of types of network elements. For example, the second device 102 includes but is not limited to a router and a switch. A manner in which the first device 101 obtains data from the second device 102 includes but is not limited to a Simple Network Management Protocol (SNMP), a Network Configuration Protocol (NETCONF), a Secure File Transfer Protocol (SFTP), a Trivial File Transfer Protocol (TFTP), a File Transfer Protocol (FTP), and telemetry. A manner in which the first device 101 sends data to the second device 102 includes but is not limited to a Border Gateway Protocol (BGP) segment routing (SR) policy protocol.

With reference to the implementation scenario shown in FIG. 1, a path determining method provided in an embodiment of this application is shown in FIG. 2, and includes but is not limited to step 201 and step 202.

Step 201: Obtain a path health degree of a first candidate path, where the first candidate path is a forwarding path from a source network element to a destination network element, and the path health degree of the first candidate path is obtained based on network element health degrees of network elements included in the first candidate path and link health degrees of links included in the first candidate path.

The network element health degree is determined based on a network element fault type and a network element fault occurrence frequency within a first monitoring periodicity, and the link health degree is determined based on a link fault type and a link fault occurrence frequency within a second monitoring periodicity. For example, the first monitoring periodicity and the second monitoring periodicity may be a same monitoring periodicity or different monitoring periodicities. For example, the first monitoring periodicity is two weeks, and the second monitoring periodicity is 48 h. It should be noted that, for different network elements, first monitoring periodicities of the network elements may be the same or different. For different links, second monitoring periodicities of the links may be the same or different. For example, a first monitoring periodicity of a network element 1 is two weeks, and a first monitoring periodicity of a network element 2 is one week. A second monitoring periodicity of a link A is 48 hours (h), and a second monitoring periodicity of a link B is 36 h.

In a possible implementation, before obtaining a path health degree of a first candidate path, the method further includes obtaining the first candidate path.

For example, a manner in which a first device obtains the first candidate path includes but is not limited to obtaining at least one forwarding path that is from the source network element to the destination network element and that is input by a user, or obtaining the forwarding path that is from the source network element to the destination network element and that is obtained based on other constraint information than health degree constraint information, or obtaining the forwarding path from the source network element to the destination network element by using a specified algorithm. For example, the first device obtains the forwarding path from the source network element to the destination network element by using a multipath partial dissemination algorithm (MPDA).

For example, as shown in FIG. 3, the source network element is a second device 102A, the destination network element is a second device 102C, and an obtained forwarding path from the source network element to the destination network element includes but is not limited to the following:

Path 1: second device 102A→second device 102B→second device 102C.

Path 2: second device 102A→second device 102B→second device 102E→second device 102F→second device 102C.

Path 3: second device 102A→second device 102D→second device 102E→second device 102F→second device 102C.

Path 4: second device 102A→second device 102D→second device 102E→second device 102B→second device 102C.

A link between the second device 102A and the second device 102B is a link 1, a link between the second device 102B and the second device 102C is a link 2, a link between the second device 102A and the second device 102D is a link 3, a link between the second device 102B and the second device 102E is a link 4, a link between the second device 102C and the second device 102F is a link 5, a link between the second device 102D and the second device 102E is a link 6, and a link between the second device 102E and the second device 102F is a link 7.

Therefore, network elements and the links included in each forwarding path from the source network element to the destination network element are as follows.

For the path 1, the network elements and the links included in the path 1 are: the second device 102A, the link 1, the second device 102B, the link 2, and the second device 102C.

For the path 2, the network elements and the links included in the path 2 are: the second device 102A, the link 1, the second device 102B, the link 4, the second device 102E, the link 7, the second device 102F, the link 5, and the second device 102C.

For the path 3, the network elements and the links included in the path 3 are: the second device 102A, the link 3, the second device 102D, the link 6, the second device 102E, the link 7, the second device 102F, the link 5, and the second device 102C.

For the path 4, the network elements and the links included in the path 4 are: the second device 102A, the link 3, the second device 102D, the link 6, the second device 102E, the link 4, the second device 102B, the link 2, and the second device 102C.

In a possible implementation, obtaining a path health degree of a first candidate path includes but is not limited to step 2011 to step 2014.

Step 2011: Obtain network element health data of the network elements in the first candidate path within the first monitoring periodicity, where the network element health data indicates network element fault information, and obtain link health data of the links in the first candidate path within the second monitoring periodicity, where the link health data indicates link fault information.

In a possible implementation, a manner in which the first device obtains network element health data of the network elements and link health data of the links includes but is not limited to any one of an SNMP, a NETCONF, an SFTP, a TFTP, an FTP, or telemetry. For example, if the network element health data may be stored in at least one record of alarms, logs, or KPI data generated during running of the network elements, the network element health data of the network elements is obtained based on the at least one of the alarms, the logs, or the KPI data of the network elements. In other words, that the first device obtains network element health data of the network elements in the first candidate path within the first monitoring periodicity includes the following. The first device obtains the at least one of the alarms, the logs, or the KPI data of the network elements in the first candidate path within the first monitoring periodicity. Because the network element health data can be obtained based on different records, a manner of obtaining the network element health data is flexible.

In a possible implementation, if the link health data may be stored in at least one record of alarms, logs, or KPI data generated during running of the links, the link health data of the links is obtained based on the at least one of the alarms, the logs, or the KPI data of the links. In other words, that the first device obtains link health data of the links in the first candidate path within the second monitoring periodicity includes the following. The first device obtains the at least one of the alarms, the logs, or the KPI data of the links in the first candidate path within the second monitoring periodicity. The record storing the link health data may be stored on at least one network element connected to a link. Because the link health data can be obtained based on different records, a manner of obtaining the link health data is flexible.

Step 2012: Obtain the network element health degrees of the network elements based on the network element health data of the network elements.

In a possible implementation, step 2012 includes but is not limited to step 20121 and step 20122.

Step 20121: Determine network element health degree impact factors of the network elements based on the network element health data of the network elements.

In a possible implementation, determining network element health degree impact factors of the network elements based on the network element health data of the network elements includes obtaining a network element fault type of a first network element and a network element fault occurrence frequency of the first network element based on network element health data of the first network element within the first monitoring periodicity, and determining network element health degree impact factors of the first network element based on the network element fault type of the first network element and the network element fault occurrence frequency of the first network element, where the first network element is any one of the network elements in the first candidate path.

For example, the network element health data of the first network element includes the network element fault type and the network element fault occurrence frequency that are of the first network element. The network element fault occurrence frequency includes time and a quantity of faults that occur on a network element. For example, the network element health data of the first network element within the first monitoring periodicity includes: 9:00 at which a fault 1 occurs on the network element 1 and lasts for 1 min, 10:00 at which a fault 2 occurs and lasts for 1 min, and 11:00 at which a fault 1 occurs and lasts for 1 min.

For example, the determined network element health degree impact factors include a first fault type factor and a first fault probability factor, and the first fault probability factor includes at least one of accumulated fault duration, an accumulated fault quantity, or an average fault interval. In a possible implementation, the accumulated fault duration is duration determined based on a time point at which a fault occurs, the accumulated fault quantity is an accumulated quantity of faults that occur, and the average fault interval is an interval determined based on an interval between a plurality of faults and a quantity of faults that occur. For example, the determined network element health degree impact factors include: a fault type, accumulated fault duration within a first time period, an accumulated fault quantity within the first time period, an average fault interval within the first time period, and an accumulated fault quantity in a second time period. The first fault type factor includes the fault type, and the first fault probability factor includes the accumulated fault duration within the first time period, the accumulated fault quantity within the first time period, the average fault interval within the first time period, and the accumulated fault quantity in the second time period.

It should be noted that the network element health degree impact factors of the first network element are determined based on the network element health data of the first network element within the first monitoring periodicity. For different monitoring periodicities, network element health degree impact factors of the first network element determined within the monitoring periodicities may be the same or different.

Step 20122: Obtain the network element health degrees of the network elements based on the network element health degree impact factors of the network elements.

In a possible implementation, a manner of obtaining the network element health degrees of the network elements based on the network element health degree impact factors of the network elements includes but is not limited to the following two manners.

Manner A: The network element health degrees of the network elements are obtained based on the network element health degree impact factors of the network elements and by using a first health degree algorithm.

For example, obtaining the network element health degrees of the network elements based on the network element health degree impact factors of the network elements and by using a first health degree algorithm includes obtaining a network element health degree statistical value based on health degree measurement results of the network element health degree impact factors of the first network element, and using the network element health degree statistical value as a network element health degree of the first network element.

In a possible implementation, obtaining a network element health degree statistical value based on health degree measurement results of the network element health degree impact factors of the first network element includes accumulating the health degree measurement results of the network element health degree impact factors of the first network element to obtain the network element degree statistical value. For example, types of the network element health degree impact factors and the health degree measurement results of the network element health degree impact factors are shown in Table 1.

TABLE 1

| Types of network element health degree impact factors | | | Health degree measurement result |
|---|---|---|---|
| First fault type factor | Fault type | Network element central processing unit (CPU) usage threshold-crossing | 7 |
| | | Network element memory usage threshold-crossing | 7 |
| | | Power supply function exception | 6 |
| | | Board temperature threshold-crossing | 5 |
| First fault probability factor | Accumulated fault duration within a first time period | Accumulated fault duration: 0 min | 0 |
| | | 0 min < Accumulated fault duration ≤ 1 minute (min) | 6 |
| | | 1 min < Accumulated fault duration ≤ 5 min | 8 |
| | | Accumulated fault duration > 5 min | 10 |
| | Accumulated fault quantity within the first time period | 0 accumulated fault | 0 |
| | | 1 accumulated fault | 6 |
| | | 2 ≤ Accumulated fault quantity < 5 | 8 |
| | | Accumulated fault quantity ≥ 5 | 10 |
| | | 0 min < Average fault interval <= 1 min | 10 |
| | Average fault interval within the first time | 1 min < Average fault interval <= 5 min | 9 |

TABLE 1-continued

| Types of network element health degree impact factors | | Health degree measurement result |
| --- | --- | --- |
| period | 5 min < Average fault interval <= 30 min | 8 |
| | No fault | 0 |
| Accumulated fault quantity within a second time period | Accumulated fault quantity: 0 | 0 |
| | Accumulated fault quantity: 1 | 6 |
| | 2 ≤ Accumulated fault quantity < 5 | 8 |
| | Accumulated fault quantity ≥ 5 | 10 |

In a possible implementation, if a plurality of fault types occur on a network element, a network element health degree statistical value of the network element is obtained based on the fault type with a highest health degree measurement result. For example, if the CPU usage threshold-crossing and the board temperature threshold-crossing occur on a network element, a network element health degree statistical value of the network element is obtained by using the 7 health degree measurement results corresponding to the CPU usage threshold-crossing. In another possible implementation, if a plurality of fault types occur on a network element, a network element health degree statistical value of the network element is obtained based on an average value of health degree measurement results of the fault types.

It should be noted that the types of the network element health degree impact factors and the health degree measurement results of the network element health degree impact factors that are shown in Table 1 are merely an example of the types of the network element health degree impact factors and the health degree measurement results of the network element health degree impact factors that are described in this embodiment of this application. This is not limited in this embodiment of this application.

For example, CPU usage threshold-crossing occurs on the first network element once at 9:00, duration is 1 min, a first time period is 24 hours (h), and a second time period is 2 weeks. In this case, for the first network element, an accumulated fault duration within the first time period is 1 min, an accumulated fault quantity is 1, and an accumulated fault quantity within the second time period is 1. Because a health degree measurement result of the network element CPU usage threshold-crossing is 7, a health degree measurement result of the accumulated fault duration: 1 min within 24 h is 6, a health degree measurement result of the accumulated fault quantity: 1 within 24 h is 6, and a health degree measurement result of the accumulated fault quantity: 1 within two weeks is 6, a network element health degree statistical value of the first network element=7+6+6+6=25.

For another example, CPU usage threshold-crossing occurs on the first network element once at 9:00, duration is 3 min, power supply function exception occurs once at 9:02, duration is 2 min, a first time period is 24 h, and a second time period is 2 weeks. In this case, for the first network element, accumulated fault duration within the first time period is 4 min, an accumulated fault quantity is 2, an average fault interval is 2 min/2=1 min, and an accumulated fault quantity within the second time period is 2. Because a health degree measurement result of the network element CPU usage threshold-crossing is higher than a health degree measurement result of the power supply function exception, a network element health degree statistical value of the first network element is calculated by using the health degree measurement result of the network element CPU usage threshold-crossing. Refer to Table 1. The health degree measurement result of the network element CPU usage threshold-crossing is 7, the health degree measurement result of the accumulated fault duration: 4 min within 24 h is 8, the health degree measurement result of the accumulated fault quantity: 2 within 24 h is 8, the health degree measurement result of the average fault interval: 1 min within 24 h is 10, and the health degree measurement result of the accumulated fault quantity: 2 within 2 weeks is 8. Therefore, Network element health degree statistical value of the first network element=7+8+8+10+8=41.

In another possible implementation, obtaining a network element health degree statistical value based on health degree measurement results of the network element health degree impact factors of the first network element includes accumulating products of the health degree measurement results of the network element health degree impact factors of the first network element and weights of the network element health degree impact factors, to obtain a first accumulation result, and using a difference between a first health degree reference value and the first accumulation result as the network element health degree statistical value.

For example, the types of the network element health degree impact factors, the health degree measurement results of the network element health degree impact factors, and the weights of the network element health degree impact factors are shown in Table 2.

TABLE 2

| Types of network element health degree impact factors | | | Health degree measurement result |
| --- | --- | --- | --- |
| First fault type factor | Fault type (weight: 30%) | Network element CPU usage threshold-crossing | 70 |
| | | Network element | 70 |

TABLE 2-continued

| Types of network element health degree impact factors | | | Health degree measurement result |
| --- | --- | --- | --- |
| | | memory usage threshold-crossing | |
| | | Power supply function exception | 60 |
| | | Board temperature threshold-crossing | 50 |
| First fault probability factor | Accumulated fault duration within a first time period (weight: 20%) | Accumulated fault duration: 0 min | 0 |
| | | 0 min < Accumulated fault duration ≤ 1 min | 60 |
| | | 1 min < Accumulated fault duration ≤ 5 min | 80 |
| | | Accumulated fault duration > 5 min | 100 |
| | Accumulated fault quantity within the first time period (weight: 20%) | Accumulated fault quantity: 0 | 0 |
| | | Accumulated fault quantity: 1 | 60 |
| | | 2 ≤ Accumulated fault quantity < 5 | 80 |
| | | Accumulated fault quantity ≥ 5 | 100 |
| | Average fault interval within the first time period (weight: 20%) | 0 min < Average fault interval <= 1 min | 100 |
| | | 1 min < Average fault interval <= 5 min | 90 |
| | | 5 min < Average fault interval <= 30 min | 80 |
| | | No fault | 0 |
| | Accumulated fault quantity within a second time period (weight: 10%) | Accumulated fault quantity: 0 | 0 |
| | | Accumulated fault quantity: 1 | 60 |
| | | 2 ≤ Accumulated fault quantity < 5 | 80 |
| | | Accumulated fault quantity ≥ 5 | 100 |

For example, if a plurality of fault types occur on a network element, a network element health degree statistical value of the network element is obtained based on a fault type with a highest health degree measurement result, or a network element health degree statistical value of the network element is obtained based on an average value of health degree measurement results of the fault types.

It should be noted that the types of the network element health degree impact factors, the health degree measurement results of the network element health degree impact factors, and the weights of the network element health degree impact factors that are shown in Table 2 are merely an example of the types of the network element health degree impact factors, the health degree measurement results of the network element health degree impact factors, and the weights of the network element health degree impact factors that are described in this embodiment of this application. This is not limited in this embodiment of this application.

For example, the first time period is 24 h, the second time period is two weeks, the first health degree reference value is 100, the CPU usage threshold-crossing of the first network element within 24 h occurs once, and the duration is 1 min. The health degree measurement result of the network element CPU usage threshold-crossing is 70, and the weight is 30%, the health degree measurement result of the accumulated fault duration: 1 min within 24 h is 60, and the weight is 20%, the health degree measurement result of the accumulated fault quantity: 1 within 24 h is 60, and the weight is 20%, and the health degree measurement result of the accumulated fault quantity: 1 within two weeks is 60, and the weight is 10%. Therefore, Network element health degree statistical value=100–(70×30%+60×20%+60×20%+60×10%)=49.

Manner B: The network element health degrees of the network elements are obtained based on the network element health degree impact factors of the network elements and a first health degree model.

For example, the first health degree model is an AI model. For example, the network element health data of the first network element is input into the first health degree model, the network element health degree impact factor of the first network element is determined based on the network element fault type and the network element fault occurrence frequency that are of the first network element and by using the first health degree model, and the network element health degree output by the first health degree model is obtained. A type of the first health degree model is not limited in this embodiment of this application, and the first health degree model may be any AI model that can obtain the network element health degree. A manner of obtaining the first health degree model includes but is not limited to obtaining the first health degree model by training an initial AI model based on a training sample. The training sample may be network element health data with a known network element health degree, and the first health degree model that meets a requirement is obtained by training the initial AI model based on the training sample. For example, that the requirement is met means that accuracy reaches a threshold, or a quantity of training times reaches a predetermined quantity of times, or the model is converged. Efficiency of obtaining the network element health degrees of the network elements by using the first health degree model is high.

In addition, because the network element health degrees of the network elements may be obtained by using the first health degree algorithm, or may be obtained by using the first health degree model, the manner of obtaining the network element health degrees of the network elements in the method provided in this embodiment of this application is flexible.

Step 2013: Obtain the link health degrees of the links based on the link health data of the links.

For example, if a link is not faulty in both a current status and a historical status, a link health degree of the link does not need to be obtained based on link health data of the link, and the link health degree of the link may directly inherit a network element health degree of a network element connected to the link.

In a possible implementation, step 2013 includes but is not limited to step 20131 and step 20132.

Step 20131: Determine link health degree impact factors of the links based on the link health data of the links.

In a possible implementation, determining link health degree impact factors of the links based on the link health data of the links includes obtaining a link fault type of a first link and a link fault occurrence frequency of the first link based on link health data of the first link within the second monitoring periodicity, and determining link health degree impact factors of the first link based on the link fault type of the first link and the link fault occurrence frequency of the first link, where the first link is any one of the links in the first candidate path.

For example, the link health data of the first link includes the link fault type and the link fault occurrence frequency that are of the first link. The link fault occurrence frequency includes time and a quantity of faults that occur on a link. For example, the link health data of the first link within the second monitoring periodicity includes: 9:00 at which a fault 3 occurs on a link A and lasts for 1 min, 10:00 at which a fault 4 occurs and lasts for 1 min, 11:00 at which a fault 3 occurs and lasts for 1 min, and a frequency of 1 each time.

For example, the determined link health degree impact factors include a second fault type factor and a second fault probability factor, and the second fault probability factor includes at least one of accumulated fault duration, an accumulated fault quantity, or an average fault interval. In a possible implementation, the accumulated fault duration is duration determined based on a time point at which a fault occurs, the accumulated fault quantity is an accumulated quantity of faults that occur, and the average fault interval is an interval determined based on an interval between a plurality of faults and a quantity of faults that occur. For example, the determined link health degree impact factors include: a fault type, accumulated fault duration within a third time period, an accumulated fault quantity within the third time period, an average fault interval within the third time period, and an accumulated fault quantity in a fourth time period. The second fault type factor includes the fault type, and the second fault probability factor includes the accumulated fault duration within the third time period, the accumulated fault quantity within the third time period, the average fault interval within the third time period, and the accumulated fault quantity in the fourth time period.

It should be noted that the link health degree impact factors of the first link are determined based on the link health data of the first link within the second monitoring periodicity. For different monitoring periodicities, the link health degree impact factors of the first link determined based on the monitoring periodicities may be the same or different.

Step 20132: Obtain the link health degrees of the links based on the link health degree impact factors of the links.

In a possible implementation, a manner of obtaining the link health degrees of the links based on the link health degree impact factors of the links includes but is not limited to the following two manners.

Manner C: The link health degrees of the links are obtained based on the link health degree impact factors of the links and by using a second health degree algorithm.

For example, obtaining the link health degrees of the links based on the link health degree impact factors of the links and by using a second health degree algorithm includes obtaining a link health degree statistical value based on health degree measurement results of the link health degree impact factors of the first link, and using the link health degree statistical value as a link health degree of the first link.

In a possible implementation, obtaining a link health degree statistical value based on health degree measurement results of the link health degree impact factors of the first link includes accumulating the health degree measurement results of the link health degree impact factors of the first link to obtain the link health degree statistical value. For example, types of the link health degree impact factors and the health degree measurement results of the link health degree impact factors are shown in Table 3.

TABLE 3

| Types of link health degree impact factors | | | Health degree measurement result |
|---|---|---|---|
| Second fault type factor | Fault type | CRC of a link | 6 |
| | | Link flapping | 7 |
| Second fault probability factor | Accumulated fault duration within a third time period | Accumulated fault duration: 0 min | 0 |
| | | 0 min < Accumulated fault duration ≤ 1 min | 6 |
| | | 1 min < Accumulated fault duration ≤ 5 min | 8 |
| | | Accumulated fault duration > 5 min | 10 |
| | Accumulated fault quantity within the third time period | Accumulated fault quantity: 0 | 0 |
| | | Accumulated fault quantity: 1 | 6 |

TABLE 3-continued

| Types of link health degree impact factors | | Health degree measurement result |
|---|---|---|
| | $2 \leq$ Accumulated fault quantity $< 5$ | 8 |
| | Accumulated fault quantity $\geq 5$ | 10 |
| Average fault interval within the third time period | $0$ min $<$ Average fault interval $<= 1$ min | 10 |
| | $1$ min $<$ Average fault interval $<= 5$ min | 9 |
| | $5$ min $<$ Average fault interval $<= 30$ min | 8 |
| | No fault | 0 |
| Accumulated fault quantity within a fourth time period | Accumulated fault quantity: 0 | 0 |
| | Accumulated fault quantity: 1 | 6 |
| | $2 \leq$ Accumulated fault quantity $< 5$ | 8 |
| | Accumulated fault quantity $\geq 5$ | 10 |

In a possible implementation, if a plurality of fault types occur on a link, a link health degree statistical value of the link is obtained based on the fault type with a highest health degree measurement result. For example, if CRC and link flapping occur on a link, a link health degree statistical value of the link is obtained by using a health degree measurement result 7 corresponding to the link flapping. In another possible implementation, if a plurality of fault types occur on a link, a link health degree statistical value of the link is obtained based on an average value of health degree measurement results of the fault types.

It should be noted that the types of the link health degree impact factors and the health degree measurement results of the link health degree impact factors that are shown in Table 3 are merely an example of the types of the link health degree impact factors and the health degree measurement results of the link health degree impact factors that are described in this embodiment of this application. This is not limited in this embodiment of this application.

For example, link flapping occurs on the first link once at 9:00, duration is 1 min, a third time period is 24 h, and a fourth time period is two weeks. In this case, for the first link, an accumulated fault duration within the third time period is 1 min, an accumulated fault quantity is 1, and an accumulated fault quantity within fourth time period is 1. Because a health degree measurement result of the link flapping is 7, a health degree measurement result of the accumulated fault duration: 1 min within 24 h is 6, a health degree measurement result of the accumulated fault quantity: 1 within 24 h is 6, and a health degree measurement result of the accumulated fault quantity: 1 within two weeks is 6, a link health degree statistical value of the first link=7+6+6+6=25.

For another example, link flapping occurs on the first link once at 9:00, duration is 3 min, CRC of a link occurs once at 9:02, duration is 2 min, a third time period is 24 h, and a fourth time period is 2 weeks. In this case, for the first link, accumulated fault duration within the third time period is 4 min, an accumulated fault quantity is 2, an average fault interval is 2 min/2=1 min, and an accumulated fault quantity within the fourth time period is 2. Because the health degree measurement result of the link flapping is higher than the health degree measurement result of the CRC of the link, a link health degree statistical value of the first link is calculated by using the health degree measurement result of the link flapping. Refer to Table 3. The health degree measurement result of the link flapping is 7, the health degree measurement result of the accumulated fault duration: 4 min within 24 h is 8, the health degree measurement result of the accumulated fault quantity: 2 within 24 h is 8, the health degree measurement result of the average fault interval: 1 min within 24 h is 10, and the health degree measurement result of the accumulated fault quantity: 2 within 2 weeks is 8. Therefore, Link health degree statistical value of the first link=7+8+8+10+8=41.

In another possible implementation, obtaining a link health degree statistical value based on health degree measurement results of the link health degree impact factors of the first link includes accumulating products of the health degree measurement results of the link health degree impact factors of the first link and weights of the link health degree impact factors, to obtain a second accumulation result, and using a difference between a second health degree reference value and the second accumulation result as the link health degree statistical value.

For example, the types of the link health degree impact factors, the health degree measurement results of the link health degree impact factors, and the weights of the link health degree impact factors are shown in Table 4.

TABLE 4

| | Types of link health degree impact factors | | Health degree measurement result |
|---|---|---|---|
| Second fault type factor | Fault type (weight: 30%) | CRC of a link | 60 |
| | | Link flapping | 70 |
| Second fault | Accumulated fault | Accumulated fault | 0 |

TABLE 4-continued

| Types of link health degree impact factors | | | Health degree measurement result |
|---|---|---|---|
| probability factor | duration within a third time period (weight: 20%) | duration: 0 min | |
| | | 0 min < Accumulated fault duration ≤ 1 min | 60 |
| | | 1 min < Accumulated fault duration ≤ 5 min | 80 |
| | | Accumulated fault duration > 5 min | 100 |
| | Accumulated fault quantity within the third time period (weight: 20%) | Accumulated fault quantity: 0 | 0 |
| | | Accumulated fault quantity: 1 | 60 |
| | | 2 ≤ Accumulated fault quantity < 5 | 80 |
| | | Accumulated fault quantity ≥ 5 | 100 |
| | Average fault interval within the third time period (weight: 20%) | 0 min < Average fault interval <= 1 min | 100 |
| | | 1 min < Average fault interval <= 5 min | 90 |
| | | 5 min < Average fault interval <= 30 min | 80 |
| | | No fault | 0 |
| | Accumulated fault quantity within a fourth time period (weight: 10%) | Accumulated fault quantity: 0 | 0 |
| | | Accumulated fault quantity: 1 | 60 |
| | | 2 ≤ Accumulated fault quantity < 5 | 80 |
| | | Accumulated fault quantity ≥ 5 | 100 |

For example, if a plurality of fault types occur on a link, a link health degree statistical value of the link is obtained based on a fault type with a highest health degree measurement result, or a link health degree statistical value of the link is obtained based on an average value of health degree measurement results of the fault types.

It should be noted that the types of the link health degree impact factors, the health degree measurement results of the link health degree impact factors, and the weights of the link health degree impact factors that are shown in Table 4 are merely an example of the types of the link health degree impact factors, the health degree measurement results of the link health degree impact factors, and the weights of the link health degree impact factors that are described in this embodiment of this application. This is not limited in this embodiment of this application.

For example, the third time period is 24 h, the fourth time period is two weeks, the second health degree reference value is 100, the link flapping on the first link occurs once within 24 h, and the duration is 1 min. The health degree measurement result of the link flapping is 70, and the weight is 30%, the health degree measurement result of the accumulated fault duration: 1 min within 24 h is 60, and the weight is 20%, the health degree measurement result of the accumulated fault quantity: 1 within 24 h is 60, and the weight is 20%, and the health degree measurement result of the accumulated fault quantity: 1 within two weeks is 60, and the weight is 10%. Therefore, Link health degree statistical value=100-(70×30%+60× 20%+60× 20%+60× 10%)=49.

Manner D: The link health degrees of the links are obtained based on the link health degree impact factors of the links and a second health degree model.

For example, the second health degree model is an AI model. For example, the link health data of the first link is input into the second health degree model, the link health degree impact factors of the first link are determined based on the link fault type and the link fault occurrence frequency that are of the first link and by using the second health degree model, and the link health degree output by the second health degree model is obtained. For example, the first health degree model and the second health degree model are a same health degree model or different health degree models. A type of the second health degree model is not limited in this embodiment of this application, and the second health degree model may be any AI model that can obtain the link health degree. A manner of obtaining the second health degree model includes but is not limited to obtaining the second health degree model by training an initial AI model based on a training sample. The training sample may be link health data with a known link health degree, and the second health degree model that meets a requirement is obtained by training the initial AI model based on the training sample. For example, that the requirement is met means that accuracy reaches a threshold, or a quantity of training times reaches a predetermined quantity of times, or the model is converged. Efficiency of obtaining the link health degrees of the links by using the second health degree model is high.

In addition, because the link health degrees of the links may be obtained by using the second health degree algorithm, or may be obtained by using the second health degree model, the manner of obtaining the link health degrees of the links in the method provided in this embodiment of this application is flexible.

In a possible implementation, before obtaining the path health degree of the first candidate path, the first device obtains the network element health data of all the network elements within the first monitoring periodicity and the link health data of all the links within the second monitoring periodicity, obtains the network element health degrees of the network elements based on the network element health data of the network elements, and obtains the link health degree of the links based on the link health data of the links. A principle of a process in which the first device obtains the network element health degrees of the network elements and the link health degrees of the links is the same as that of the related processes in manner A to manner D. Details are not described herein again. For example, after obtaining the network element health degrees of all the network elements and the link health degrees of all the links, the first device stores the network element health degrees of all the network elements and the link health degrees of all the links. That the first device obtains the path health degree of the first candidate path includes the following. The first device obtains the stored network element health degrees of the network elements in the first candidate path and the stored link health degrees of the links included in the first candidate path.

It should be noted that the step of obtaining, by the first device, the network element health degrees of all the network elements within the first monitoring periodicity and the link health degrees of all the links within the second monitoring periodicity may be performed before the first candidate path is obtained, or may be performed after the first candidate path is obtained. This is not limited in this embodiment of this application. Because the first device stores the network element health degrees of all the network elements and the link health degrees of all the links, for network elements and links that are included in one forwarding path, the first device may directly obtain stored network element health degrees of the network elements and stored link health degrees of the links. Therefore, when a plurality of forwarding paths include a same network element and/or link, for the same network element and/or link, a process of obtaining a network element health degree of the network element based on network element health data of the network element and/or obtaining a link health degree of the link based on link health degree data of the link does not need to be repeated, so that higher efficiency of the obtaining manner is achieved.

Step 2014: Obtain the path health degree of the first candidate path based on the network element health degrees of the network elements and the link health degrees of the links.

In a possible implementation, step 2014 includes using a health degree that is in the network element health degrees of the network elements and the link health degrees of the links and that meets a first condition as the path health degree of the first candidate path.

For example, the first condition includes but is not limited to the following four cases. If a larger value indicates a higher health degree, the first condition is a minimum value of the network element health degrees of the network elements and the link health degrees of the links. If a larger value indicates a lower health degree, the first condition is a maximum value of the network element health degrees of the network elements and the link health degrees of the links. Alternatively, the first condition is an average value of the network element health degrees of the network elements and the link health degrees of the links. Alternatively, the first condition is an average value of a network element health degree of a specified network element and/or a link health degree of a specified link, where the specified network element is at least one network element specified in the network elements, and the specified link is at least one link specified in the links.

Figure 4:
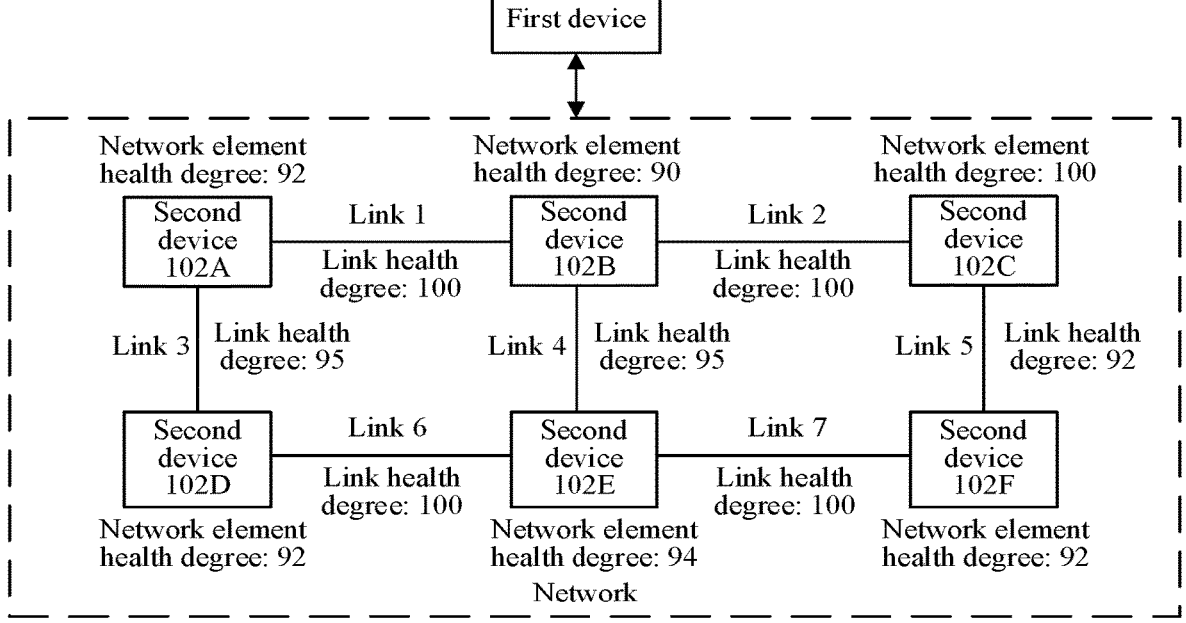
FIG. 4 is a schematic diagram of network element health degrees of network elements and link health degrees of links according to an embodiment of this application.

For example, network element health degrees of the network elements and link health degrees of the links are shown in FIG. 4, where a network element health degree of the second device 102A is 92, a network element health degree of the second device 102B is 90, a network element health degree of the second device 102C is 100, a network element health degree of the second device 102D is 92, a network element health degree of the second device 102E is 94, a network element health degree of the second device 102F is 92, a link health degree of the link 1 is 100, a link health degree of the link 2 is 100, a link health degree of the link 3 is 95, a link health degree of the link 4 is 95, a link health degree of the link 5 is 92, a link health degree of the link 6 is 100, and a link health degree of the link 7 is 100.

If the first condition is the minimum value of the network element health degrees of the network elements and the link health degrees of the links, a path health degree of a path 1 is a minimum value of the network element health degree of the second device 102A, the link health degree of the link 1, the network element health degree of the second device 102B, the link health degree of the link 2, and the network element health degree of the second device 102C, that is, the path health degree of the path 1 is 90. Similarly, a path health degree of a path 2 is 90, a path health degree of a path 3 is 92, and a path health degree of a path 4 is 90. It should be noted that, when the first condition in this embodiment of this application is another case, a principle of determining the path health degree of the first candidate path is the same as the principle of the foregoing process. Details are not described herein again.

Step 202: Determine a target forwarding path based on constraint information and the path health degree of the first candidate path, where the constraint information includes health degree constraint information, the health degree constraint information indicates a condition that a path health degree of the target forwarding path needs to meet, and the path health degree of the target forwarding path indicates stability of the target forwarding path.

In a possible implementation, as shown in FIG. 5 and FIG. 6, before step 202, the method further includes step 203: Obtain constraint information. Step 203 may be performed after step 201 shown in FIG. 5, or may be performed before step 201 shown in FIG. 6. An occasion for obtaining the constraint information is flexible.

For example, the first device obtains constraint information input by a user. For another example, the first device obtains a service requirement, and obtains constraint information based on the service requirement. A manner in which the first device obtains a service requirement includes but is not limited to receiving a service requirement input by a user, or receiving a service requirement sent by another device. For example, the implementation scenario shown in FIG. 1 further includes a third device, and the third device can exchange information with the first device. For example, the first device receives a service requirement sent by the third device, and then obtains the constraint information based on the received service requirement. For example, the third device is an orchestrator.

In a possible implementation, the service requirement includes but is not limited to a service priority, a quality requirement for transmitting service data, and a cost requirement for transmitting the service data. The quality requirement includes but is not limited to a bandwidth requirement, a delay requirement, a packet loss rate requirement, and an affinity attribute requirement. The cost requirement includes but is not limited to a hop limit requirement, a cost requirement, and an explicit node requirement. For example, one service priority corresponds to one health degree threshold. For example, a correspondence between the service priority and the health degree threshold is shown in Table 5.

TABLE 5

| Service priority | Health degree threshold |
|---|---|
| First priority | 90 |
| Second priority | 85 |
| Third priority | 80 |
| Fourth priority | 75 |

In Table 5, the service priority corresponding to the first priority is higher than the service corresponding to the second priority, and a higher health degree preset value indicates a higher requirement of a service on stability of a path. For example, a service corresponding to the first priority is an audio and video service, and the health degree threshold corresponding to the first priority is 90. A service corresponding to the second priority is a world wide web (or WEB) access service, and the health degree threshold corresponding to the second priority is 85. The audio and video service has a higher requirement on stability of a forwarding path than the WEB access service. Therefore, a value of a health degree threshold of the forwarding path corresponding to the audio and video service is greater than a value of a health degree threshold of a forwarding path corresponding to the WEB access service. It can be learned from Table 5 that, requirements of different services on path health degrees may be obtained by using service requirement information, and requirements and constraints on the path health degrees may be identified by using the values of the health degree thresholds. In Table 5, a principle of a health degree threshold corresponding to another service priority is the same as that of the health degree threshold corresponding to the first priority. Details are not described herein again. It should be noted that types of the service priorities and the health degree thresholds corresponding to the service priorities that are shown in Table 5 are merely an example for description. The service requirement may include more or fewer types of service priorities. The health degree thresholds corresponding to the service priorities may be determined based on experience or an actual requirement. This is not limited in this application.

In a possible implementation, if a service requirement obtained by the first device includes a service priority, constraint information obtained based on the service requirement includes health degree constraint information. For example, the health degree constraint information includes a health degree threshold. The health degree threshold included in the health degree constraint information is a health degree threshold corresponding to the service priority. For example, if a service requirement obtained by the first device includes a service priority, and the service priority is the first priority, constraint information obtained based on the service requirement includes health degree constraint information, where a health degree threshold included in the health degree constraint information is 90.

The service requirement may further include at least one of the quality requirement for transmitting the service data or the cost requirement for transmitting the service data. Therefore, if the service requirement includes the quality requirement for transmitting the service data, the obtained constraint information includes quality constraint information. If the service requirement includes the cost requirement for transmitting the service data, the obtained constraint information includes cost constraint information. The quality constraint information is used to constrain quality of the determined forwarding path, and the cost constraint information is used to constrain a cost required for transmitting the service data through the determined forwarding path. It should be noted that, if the service requirement includes a plurality of quality requirements, the obtained constraint information includes a plurality of pieces of quality constraint information. If the service requirement includes a plurality of cost requirements, the obtained constraint information includes a plurality of pieces of cost constraint information.

For example, if the quality requirement includes the bandwidth requirement, the obtained quality constraint information includes bandwidth constraint information. If the quality requirement includes the delay requirement, the obtained quality constraint information includes delay constraint information. If the quality requirement includes the packet loss rate requirement, the obtained quality constraint information includes packet loss rate constraint information. If the quality requirement includes the affinity attribute requirement, the obtained quality constraint information includes affinity attribute constraint information. For example, if the cost requirement includes the hop limit requirement, the obtained cost constraint information includes hop limit constraint information. If the cost requirement includes the cost requirement, the obtained cost constraint information includes cost constraint information. If the cost requirement includes the explicit node requirement, the obtained cost constraint information includes explicit node constraint information.

For example, if the service requirement obtained by the first device includes a service priority and a bandwidth requirement for transmitting service data, constraint information obtained based on the service requirement includes health degree constraint information and bandwidth constraint information. For example, the bandwidth constraint information includes a bandwidth threshold, and the bandwidth threshold is obtained based on the bandwidth requirement. For example, the service requirement obtained by the first device includes a service priority and a bandwidth requirement for transmitting service data. If the service priority is a first priority, and the bandwidth requirement is 500 megabits per second (Mbps), constraint information obtained based on the service requirement includes health degree constraint information and bandwidth constraint information, where a health degree threshold included in the health degree constraint information is 90, and a bandwidth threshold included in the bandwidth constraint information is 500 Mbps.

For another example, if the service requirement obtained by the first device includes a service priority and a delay requirement for transmitting service data, constraint information obtained based on the service requirement includes health degree constraint information and delay constraint information. For example, the delay constraint information includes a delay threshold, and the delay threshold is obtained based on the delay requirement. For example, the service requirement obtained by the first device includes a service priority and a delay requirement for transmitting service data. If the service priority is a first priority, and the delay requirement is 100 milliseconds (ms), constraint information obtained based on the service requirement includes health degree constraint information and delay constraint information, where a health degree threshold included in the health degree constraint information is 90, and a delay threshold included in the delay constraint information is 100 ms.

For another example, if the service requirement obtained by the first device includes a service priority, a bandwidth requirement for transmitting service data, and a delay requirement for transmitting service data, the constraint information obtained based on the service requirement includes health degree constraint information, bandwidth constraint information, and delay constraint information. For example, the service requirement obtained by the first device includes a service priority, a bandwidth requirement for transmitting service data, and a delay requirement for transmitting service data. If the service priority is a first priority, the bandwidth requirement is 500 Mbps, and the delay requirement is 100 milliseconds (ms), constraint information obtained based on the service requirement includes health degree constraint information, bandwidth constraint information, and delay constraint information, where a health constraint threshold included in the health degree constraint information is 90, and a bandwidth threshold included in the bandwidth constraint information is 500 Mbps, a delay threshold included in the delay constraint information is 100 ms.

It should be noted that specific constraint content of the constraint information is not limited in this embodiment of this application, and may be determined based on an application scenario or an actual application requirement. In this embodiment of this application, the constraint information can include different types of constraint information. Therefore, the constraint information has high flexibility, and the forwarding path determined based on the constraint information better meets the service requirement.

In a possible implementation, after obtaining the constraint information, the first device performs an operation of determining the target forwarding path based on the constraint information and the path health degree of the first candidate path.

For example, the obtained service requirement further includes indication information, and the indication information indicates a source network element and a destination network element. The first device obtains the source network element and the destination network element based on the indication information. For example, the indication information indicates that the source network element is the second device 102A, and the destination network element is the second device 102C. A specific representation form of the indication information may be determined based on an actual requirement. This is not limited in this embodiment of this application.

In a possible implementation, determining a target forwarding path based on constraint information and the path health degree of the first candidate path includes using the first candidate path as the target forwarding path if the path health degree of the first candidate path meets the health degree constraint information.

For example, that the path health degree of the first candidate path meets the health degree constraint information includes the following. The path health degree of the first candidate path meets a second condition. For example, the second condition includes but is not limited to the following four cases. If a larger value indicates a higher health degree, the second condition is that the path health degree is greater than or equal to a first health degree threshold. If a larger value indicates a lower health degree, the second condition is that the path health degree is less than or equal to a second health degree threshold. The first health degree threshold and the second health degree threshold may be determined based on experience or an actual requirement. This is not limited in this application.

For example, the larger value indicates the higher health degree, and the first health degree threshold is 90. Because the path health degree of the path 1 is 90, the path health degree of the path 2 is 90, the path health degree of the path 3 is 92, and the path health degree of the path 4 is 90, the path health degrees of the path 1, the path 2, the path 3, and the path 4 all meet the health degree constraint information.

Figure 7:
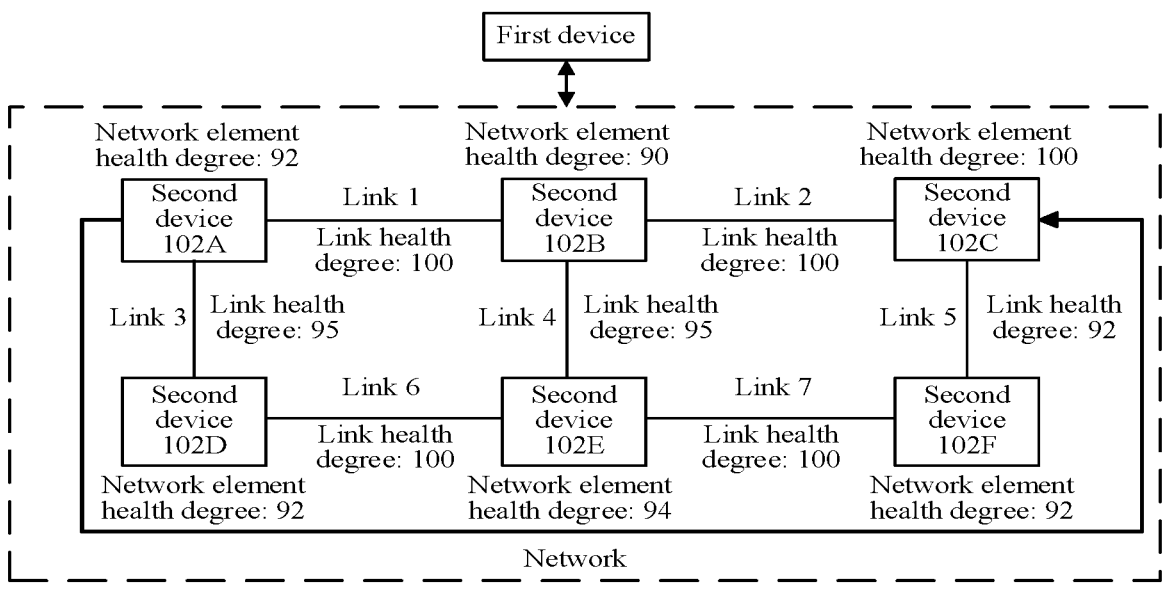
FIG. 7 is a schematic diagram of a determined target forwarding path according to an embodiment of this application.

In a possible implementation, if there are a plurality of forwarding paths whose path health degrees meet the health degree constraint information, a forwarding path with a high path health degree in the plurality of forwarding paths is used as the target forwarding path. For example, a forwarding path with a highest path health degree in the plurality of forwarding paths is used as the target forwarding path. For example, as shown in FIG. 7, when the path health degrees of the path 1, the path 2, the path 3, and the path 4 all meet the health degree constraint information, the path 3 with the highest path health degree is used as the target forwarding path. To be specific, the target forwarding path is: second device 102A→second device 102D→second device 102E→second device 102F→second device 102C. For example, if there are a plurality of forwarding paths whose path health degrees meet the health degree constraint information, any one of the plurality of forwarding paths may be used as the target forwarding path.

The constraint information may further include at least one of quality constraint information or cost constraint information. Therefore, in a possible implementation, determining a target forwarding path based on constraint information and the path health degree of the first candidate path includes determining the target forwarding path based on the at least one of the quality constraint information or the cost constraint information, the health degree constraint information, and the path health degree of the first candidate path.

For example, based on cases of constraint information included in the constraint information, determining a target forwarding path, the at least one of the quality constraint information or the cost constraint information, the health degree constraint information, and the path health degree of the first candidate path includes but is not limited to the following three cases.

Case 1: The constraint information includes the quality constraint information and the health degree constraint information.

For example, for case 1, the target forwarding path is determined based on the quality constraint information, the health degree constraint information, and the path health degree of the first candidate path. Determining the target forwarding path based on the quality constraint information, the health degree constraint information, and the path health degree of the first candidate path includes but is not limited to step 1-1 and step 1-2.

Step 1-1: Determine quality information of the first candidate path.

For example, the first device obtains quality information of the links included in the first candidate path, and determines the quality information of the first candidate path based on the quality information of the links.

For example, if the quality information includes a bandwidth, the quality information of the first candidate path is a bandwidth of the first candidate path. Determining the quality information of the first candidate path based on the quality information of the links includes determining the bandwidth of the first candidate path based on bandwidths of the links. For example, a minimum value of the bandwidths of the links is determined as the bandwidth of the first candidate path. It should be noted that the bandwidth of the first candidate path may alternatively be determined in another manner based on the bandwidths of the links. This is not limited in this embodiment of this application.

For another example, if the quality information includes a delay, the quality information of the first candidate path is a delay of the first candidate path. Determining the quality information of the first candidate path based on the quality information of the links includes determining the delay of the first candidate path based on delays of the links. For example, a sum of the delays of the links is determined as the delay of the first candidate path. It should be noted that the delay of the first candidate path may alternatively be determined in another manner based on the delays of the links. This is not limited in this embodiment of this application.

Step 1-2: If the path health degree of the first candidate path meets the health degree constraint information and the quality information meets the quality constraint information, use the first candidate path as the target forwarding path.

A principle of a process of determining that the path health degree of the first candidate path meets the health degree constraint information is the same as that of the foregoing process of determining that the path health degree of the first candidate path meets the health degree constraint information. Details are not described herein again. For example, that the quality information of the first candidate path meets the quality constraint information includes the following. The quality information of the first candidate path meets a third condition. For example, if the quality information is the bandwidth, the third condition is that the bandwidth of the first candidate path is greater than or equal to a bandwidth threshold. If the quality information is the delay, the third condition is that the delay of the first candidate path is less than or equal to a delay threshold.

Case 2: The constraint information includes the cost constraint information and the health degree constraint information.

For example, for case 2, the target forwarding path is determined based on the cost constraint information, the health degree constraint information, and the path health degree of the first candidate path. Determining the target forwarding path based on the cost constraint information, the health degree constraint information, and the path health degree of the first candidate path includes but is not limited to step 2-1 and step 2-2.

Step 2-1: Determine cost information of the first candidate path.

For example, the first device obtains cost information of the links included in the first candidate path, and determines the cost information of the first candidate path based on the cost information of the links.

For example, if the cost information is a cost, the cost information of the first candidate path is a cost of the first candidate path. Determining the cost information of the first candidate path based on the cost information of the links includes determining the cost of the first candidate path based on costs of the links. For example, a sum of the costs of the links is determined as the cost of the first candidate path. It should be noted that the cost of the first candidate path may alternatively be determined in another manner based on the costs of the links. This is not limited in this embodiment of this application.

Step 2-2: If the path health degree of the first candidate path meets the health degree constraint information and the cost information meets the cost constraint information, use the first candidate path as the target forwarding path.

A principle of a process of determining that the path health degree of the first candidate path meets the health degree constraint information is the same as that of the foregoing process of determining that the path health degree of the first candidate path meets the health degree constraint information. Details are not described herein again. For example, that the cost information of the first candidate path meets the cost constraint information includes the following. The cost information of the first candidate path meets a fourth condition. For example, if the cost information is the cost, the fourth condition is that the cost of the first candidate path is less than or equal to a cost threshold.

Case 3: The constraint information includes the quality constraint information, the cost constraint information, and the health degree constraint information.

For example, for case 3, the target forwarding path is determined based on the quality constraint information, the cost constraint information, the health degree constraint information, and the path health degree of the first candidate path. Determining the target forwarding path based on the quality constraint information, the cost constraint information, the health degree constraint information, and the path health degree of the first candidate path includes but is not limited to step 3-1 and step 3-2.

Step 3-1: Determine quality information of the first candidate path and cost information of the first candidate path.

A principle of a process of determining quality information of the first candidate path is the same as that of a related process in case 1, and a principle of a process of determining cost information of the first candidate path is the same as that of a related process in case 2. Details are not described herein again.

Step 3-2: If the path health degree of the first candidate path meets the health degree constraint information, the quality information meets the quality constraint information, and the cost information meets the cost constraint information, use the first candidate path as the target forwarding path.

A principle of a process of determining that the path health degree of the first candidate path meets the health degree constraint information is the same as that of the foregoing process of determining that the path health degree of the first candidate path meets the health degree constraint information, a principle of a related process of determining that the quality information meets the quality constraint information is the same as that of a related process in case 1, and a principle of a related process of determining that the cost information meets the cost constraint information is the same as that of the related process in case 2. Details are not described herein again.

Figure 8:
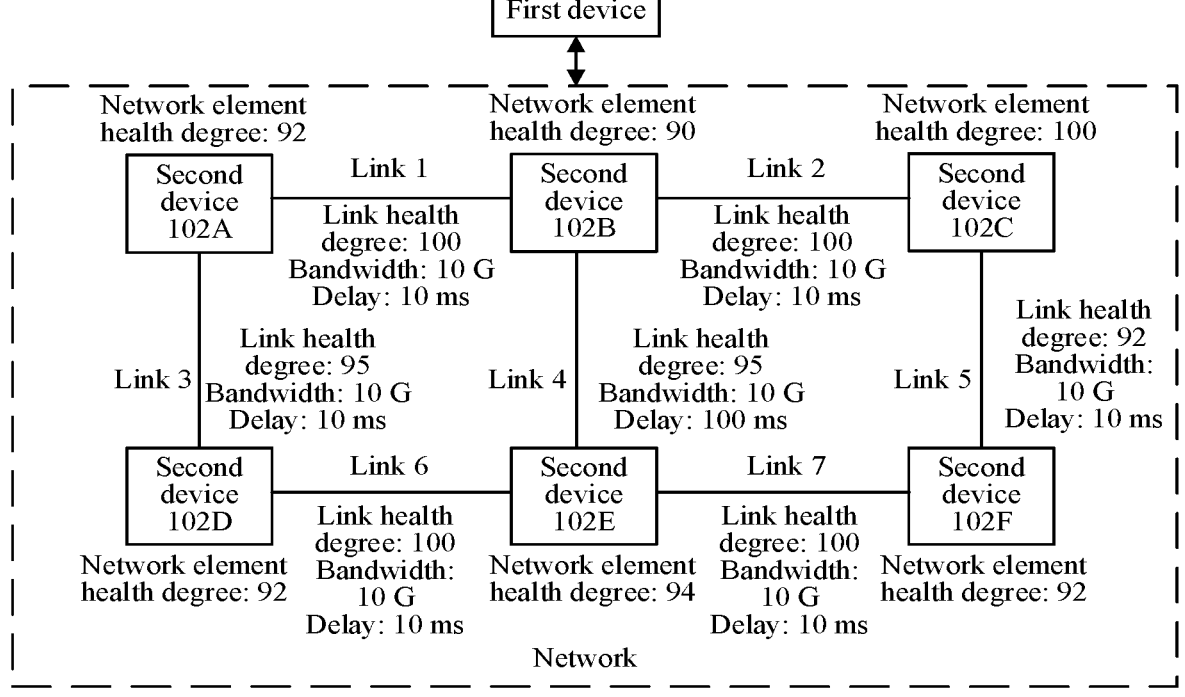
FIG. 8 is a schematic diagram of bandwidths of links and delays of the links according to an embodiment of this application.

For example, as shown in FIG. 8, the quality information includes a bandwidth and a delay. If bandwidths of the link 1 to the link 7 are all 10 gigabits per second (Gbps), bandwidths of the path 1 to the path 4 are all 10 Gbps. If a delay of the link 1 is 10 ms, a delay of the link 2 is 10 ms, a delay of the link 3 is 10 ms, a delay of the link 4 is 100 ms, a delay of the link 5 is 10 ms, a delay of the link 6 is 10 ms, and a delay of the link 7 is 10 ms, a delay of the path 1 is 20 ms, a delay of the path 2 is 130 ms, a delay of the path 3 is 40 ms, and a delay of the path 4 is 130 ms. In response to the third condition including that the bandwidth of the first candidate path is greater than or equal to the bandwidth threshold and the delay of the first candidate path is less than or equal to the delay threshold, if the bandwidth threshold is 500 M, and the delay threshold is 100 ms, both quality information of the path 1 and quality information of the path 3 meet quality constraint information. In addition, the path health degree of the path 1 is 90, the path health degree of the path 2 is 90, the path health degree of the path 3 is 92, and the path health degree of the path 4 is 90. Therefore, in response to the first condition including that the path health degree of the first candidate path is greater than or equal to the first health degree threshold, if the first health degree threshold is 90, the path health degrees of the path 1 to the path 4 all meet health degree constraint information.

In conclusion, the path 1 and the path 3 are forwarding paths whose path health degrees meet the health degree constraint information, whose quality information meets the quality constraint information, and whose cost information meets the cost constraint information. For example, the path 3 with the highest path health degree is used as the target forwarding path.

It should be noted that, regardless of which of the foregoing cases, the processes of determining whether the path health degree meets the health degree constraint information, whether the quality information meets the quality condition constraint information, and whether the cost information meets the cost condition constraint information may be performed simultaneously, or whether a type of constraint information is met is determined first, and whether a next type of constraint information is met is determined when the constraint information is met. A sequence of the processes of determining whether the path health degree meets the health degree constraint information, whether the quality information meets the quality constraint information, and whether the cost information meets the cost constraint information is not limited in this embodiment of this application. The forwarding path whose path health degree meets the health degree constraint information is used as the target forwarding path, so that the forwarding path with high stability can be determined, and stable transmission of service data can be ensured.

Figure 9:
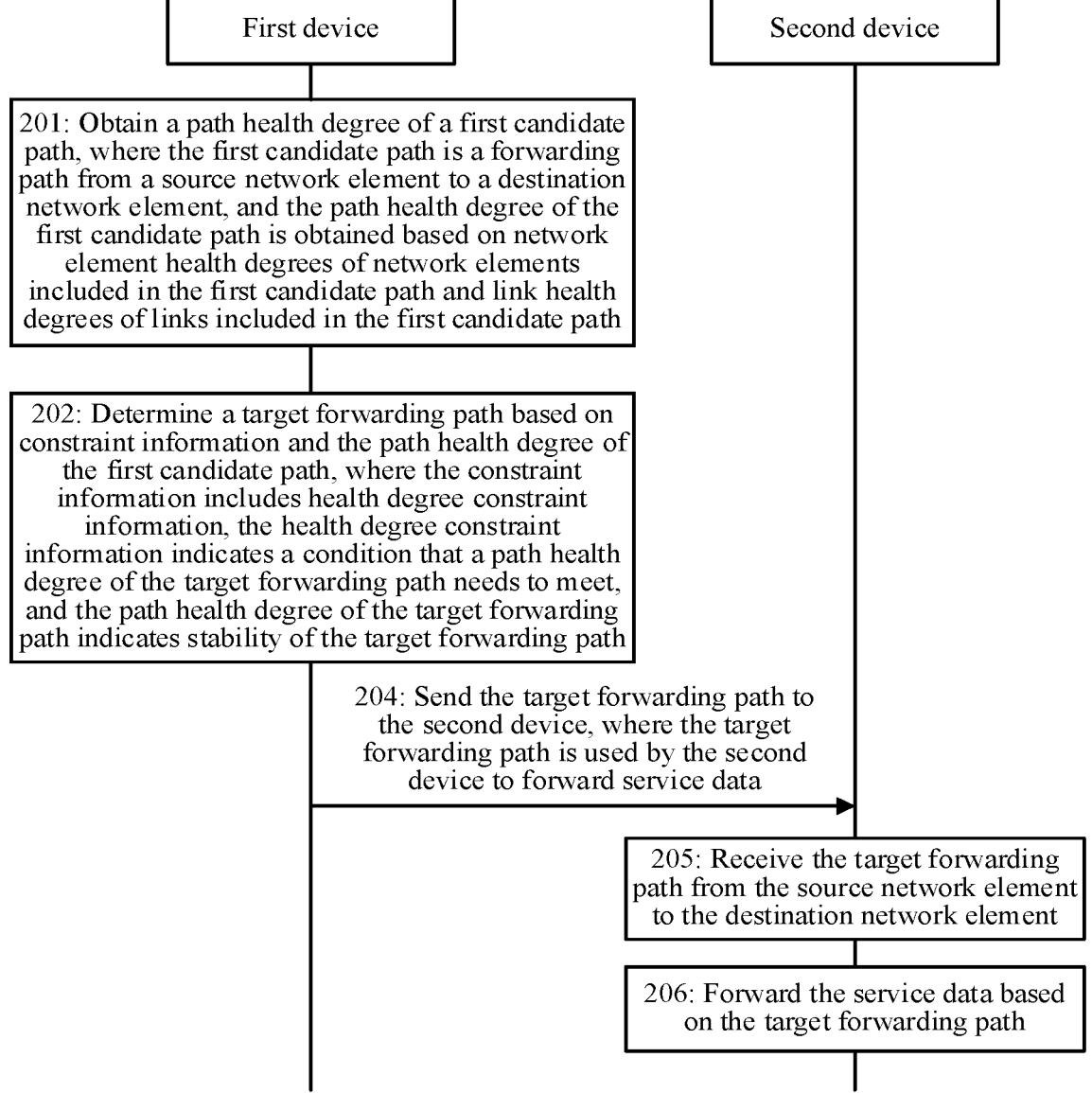
FIG. 9 is a flowchart of another path determining method according to an embodiment of this application.

In a possible implementation, as shown in FIG. 9, after step 202, the path determining method further includes the following steps.

Step 204: Send the target forwarding path to the second device, where the target forwarding path is used by the second device to forward service data.

In a possible implementation, the first device obtains the target forwarding path based on the health degree constraint information, and delivers, to the second device, label information strictly corresponding to the target forwarding path. The second device forwards the service packet based on the label information. The second device is the source network element or all the network elements included in the forwarding path.

For example, the first device sends the forwarding path to the second device according to a BGP SR policy protocol. For example, the path 3 is the target forwarding path. Therefore, the first device sends the target forwarding path to the second device 102A, the second device 102D, the second device 102E, the second device 102F, and the second device 102C according to the BGP SR policy protocol.

In a possible implementation, after step 202, the method further includes updating the target forwarding path. A manner of updating the target forwarding path includes but is not limited to the following three manners.

Manner 1: Update the target forwarding path based on a path health degree change of the forwarding path.

For example, Manner 1 includes but is not limited to step 4-1 and step 4-2.

Step 4-1: Monitor the path health degree of the target forwarding path.

Figure 10:
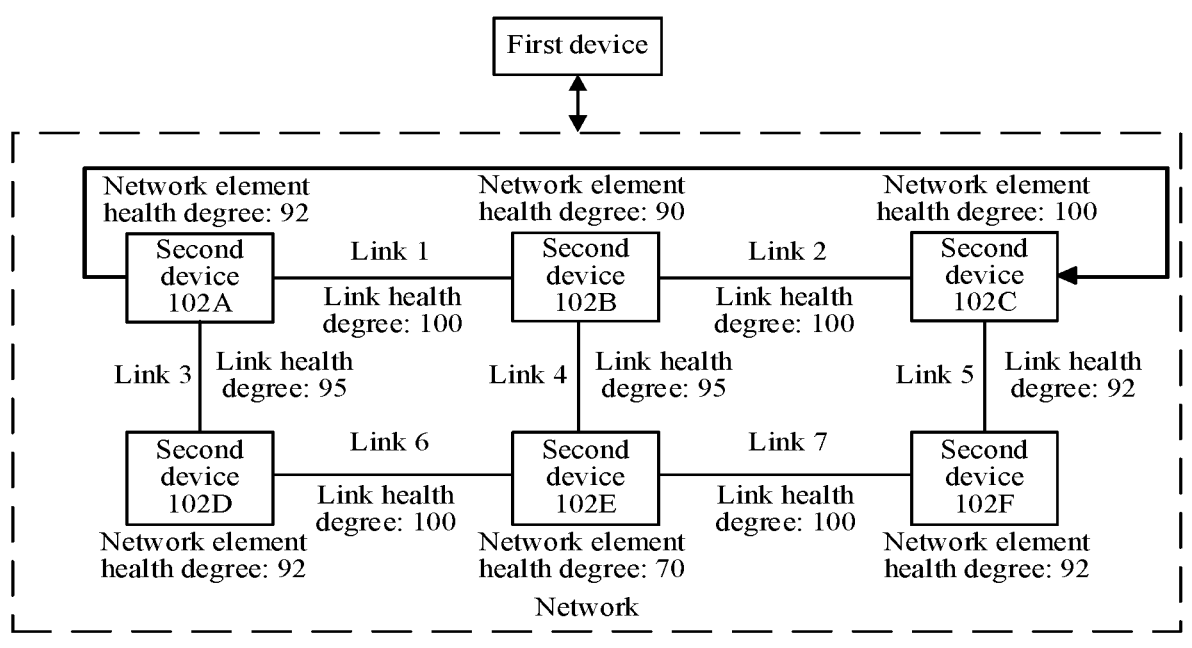
FIG. 10 is a schematic diagram of an updated target forwarding path according to an embodiment of this application.

In a possible implementation, the first device stores the path health degree of the target forwarding path, and the first device periodically re-performs a process of obtaining the path health degree of the target forwarding path. In a case that a re-obtained path health degree of the target forwarding path is different from the stored path health degree, the path health degree of the target forwarding path changes. For example, as shown in FIG. 10, the target forwarding path is the path 3. Because the network element health degree of the second device 102E included in the target forwarding path changes to 70, the monitored path health degree of the target forwarding path changes to 70.

Step 4-2: Update the target forwarding path based on the health degree constraint information if the path health degree does not meet the health degree constraint information.

In a possible implementation, updating the target forwarding path based on the health degree constraint information includes re-performing the steps of obtaining a path health degree of a first candidate path, and determining a target forwarding path based on the health degree constraint information and the path health degree of the first candidate path, and using the re-determined target forwarding path as the updated target forwarding path.

For example, updating the target forwarding path based on the health degree constraint information includes re-obtaining a path health degree of another forwarding path, except the target forwarding path, that meets the health degree constraint information and that is in the forwarding paths obtained last time, and if the path health degree of the forwarding path meets the health degree constraint information, using the forwarding path as the updated target forwarding path, or if the path health degree of the forwarding path does not meet the health degree constraint information, re-performing the steps of obtaining a path health degree of a first candidate path, and determining a target forwarding path based on health degree constraint information and the path health degree of the first candidate path.

For example, the forwarding path, except the target forwarding path, that meets the health degree constraint information and that is in the forwarding paths obtained last time is a path 1, and a path health degree of the path 1 is re-obtained. If the path health degree of the path 1 meets the health degree constraint information, the path 1 is used as the updated target forwarding path. Because a probability that the forwarding path whose path health degree can meet the health degree constraint information last time can still meet the health degree constraint information is high, efficiency of updating the target forwarding path is high. For example, as shown in FIG. 10, the updated target forwarding path is a path 1.

Manner 2: Update the target forwarding path based on a received message for updating the forwarding path.

In a possible implementation, after determining a target forwarding path, the method further includes receiving a message for updating the forwarding path, where the message for updating the forwarding path indicates to update the target forwarding path. For example, the message for updating the forwarding path may be a message periodically sent by the third device.

For example, after receiving the message for updating the forwarding path, the first device performs an operation of updating the target forwarding path. For example, in response to the message for updating the forwarding path, the first device updates the target forwarding path based on the health degree constraint information.

A principle of the step of updating the target forwarding path based on the health degree constraint information is the same as that of a related process of obtaining a path health degree of a first candidate path in step 201 and determining a target forwarding path based on constraint information and the path health degree of the first candidate path in step 202. Details are not described herein again. Because the target forwarding path is updated in response to the message for updating the forwarding path, an updated target forwarding path may be a forwarding path that has a high path health degree in the forwarding paths whose path health degrees meet the health degree constraint information. That is, in this method, service data can be transmitted based on the forwarding path that has the high path health degree, and stability of transmitting the service data based on the forwarding path is high.

Manner 3: Update the target forwarding path based on a first time periodicity and the health degree constraint information.

For example, the first time periodicity may be a time periodicity set based on experience or an actual requirement. This is not limited in this embodiment of this application. For example, the first time periodicity is one week. That is, the first device updates the target forwarding path once every one week based on the health degree constraint information.

A principle of the step of updating the target forwarding path based on the health degree constraint information is the same as that of a related process of obtaining a path health degree of a first candidate path in step 201 and determining a target forwarding path based on constraint information and the path health degree of the first candidate path in step 202. Details are not described herein again. Because the target forwarding path is updated based on the first time periodicity, an updated target forwarding path may be a forwarding path that has a high path health degree in the forwarding paths whose path health degrees meet the health degree constraint information. In this method, service data can be transmitted based on the forwarding path that has the high path health degree, and stability of transmitting the service data based on the forwarding path is high.

It should be noted that, regardless of which manner of updating the target forwarding path in the foregoing three manners, after the target forwarding path is updated, the path determining method further includes switching from the target forwarding path before the update to an updated target forwarding path according to MBB. For example, the target forwarding path before the update is the path 3, and an updated target forwarding path is the path 1. The path 1 is first established, and the path 3 is then disconnected, so that switching from the path 3 to the path 1 is implemented. The path is switched according to the MBB, so that transmission of service data during the path switching can be ensured, and a loss of the service data can be avoided.

The foregoing step 201 to step 204 are all a process in which the first device determines the path. Refer to FIG. 9. The following uses the second device as an example to describe the path determining method.

Step 205: Receive the target forwarding path from the source network element to the destination network element.

The target forwarding path is determined based on constraint information and the path health degree of the first candidate path, and the first candidate path is a forwarding path from the source network element to the destination network element. The path health degree of the first candidate path is obtained based on network element health degrees of network elements included in the first candidate path and link health degrees of links included in the first candidate path, the network element health degree is determined based on a network element fault type and a network element fault occurrence frequency within a first monitoring periodicity, the link health degree is determined based on a link fault type and a link fault occurrence frequency within a second monitoring periodicity, the constraint information includes health degree constraint information, the health degree constraint information indicates a condition that a path health degree of the target forwarding path needs to meet, and the path health degree of the target forwarding path indicates stability of the target forwarding path. For example, the second device receives the target forwarding path from the source network element to the destination network element according to a BGP SR policy protocol.

Step 206: Forward the service data based on the target forwarding path.

In a possible implementation, after forwarding the service data based on the target forwarding path, the path determining method further includes receiving an updated target forwarding path, and forwarding the service data based on the updated target forwarding path. For example, the second device receives the updated target forwarding path according to the BGP SR policy protocol.

In the method provided in this embodiment of this application, the path health degree of the forwarding path from the source network element to the destination network element is obtained, the target forwarding path whose path health degree meets the condition is further determined based on the health degree constraint information and the path health degree of the forwarding path, so that a forwarding path with high stability is determined, and stable transmission of service data is ensured. In addition, due to the high stability of the forwarding path, a probability of switching the forwarding path during the transmission of the service data is low, so that a probability of losing the service data during the path switching is reduced, thereby ensuring the stable transmission of the service data.

In addition, the target forwarding path can be updated in the solution provided in this embodiment of this application. Therefore, when stability of the original target forwarding path decreases, the target forwarding path may be updated, so that service data is transmitted based on an updated target forwarding path, thereby ensuring stable transmission of the service data.

Figure 11:
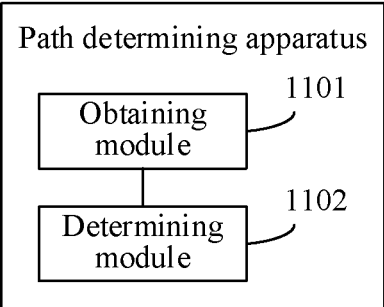
FIG. 11 is a schematic diagram of a structure of a path determining apparatus according to an embodiment of this application.

FIG. 11 is a schematic diagram of a structure of a path determining apparatus according to an embodiment of this application. The apparatus is used in a first device, and the first device is the first device shown in FIG. 2 to FIG. 10. Based on a plurality of following modules shown in FIG. 11, the path determining apparatus shown in FIG. 11 can perform all or some operations performed by the first device. It should be understood that the apparatus may include more additional modules than the shown modules or omit some of the shown modules. This is not limited in this embodiment of this application. As shown in FIG. 11, the apparatus includes an obtaining module 1101 configured to obtain a path health degree of a first candidate path, where the first candidate path is a forwarding path from a source network element to a destination network element, and the path health degree of the first candidate path is obtained based on network element health degrees of network elements included in the first candidate path and link health degrees of links included in the first candidate path, and the network element health degree is determined based on a network element fault type and a network element fault occurrence frequency within a first monitoring periodicity, and the link health degree is determined based on a link fault type and a link fault occurrence frequency within a second monitoring periodicity, and a determining module 1102 configured to determine a target forwarding path based on constraint information and the path health degree of the first candidate path, where the constraint information includes health degree constraint information, the health degree constraint information indicates a condition that a path health degree of the target forwarding path needs to meet, and the path health degree of the target forwarding path indicates stability of the target forwarding path.

In a possible implementation, the obtaining module 1101 is further configured to obtain the constraint information.

In a possible implementation, the obtaining module 1101 is configured to obtain network element health data of the network elements in the first candidate path within the first monitoring periodicity, where the network element health data indicates network element fault information, obtain link health data of the links in the first candidate path within the second monitoring periodicity, where the link health data indicates link fault information, obtain the network element health degrees of the network elements based on the network element health data of the network elements, obtain the link health degrees of the links based on the link health data of the links, and obtain the path health degree of the first candidate path based on the network element health degrees of the network elements and the link health degrees of the links.

In a possible implementation, the obtaining module 1101 is configured to determine network element health degree impact factors of the network elements based on the network element health data of the network elements, obtain the network element health degrees of the network elements based on the network element health degree impact factors of the network elements, determine link health degree impact factors of the links based on the link health data of the links, and obtain the link health degrees of the links based on the link health degree impact factors of the links.

In a possible implementation, the obtaining module 1101 is configured to obtain a network element fault type of a first network element and a network element fault occurrence frequency of the first network element based on network element health data of the first network element within the first monitoring periodicity, determine network element health degree impact factors of the first network element based on the network element fault type of the first network element and the network element fault occurrence frequency of the first network element, where the first network element is any one of the network elements in the first candidate path, obtain a link fault type of a first link and a link fault occurrence frequency of the first link based on link health data of the first link within the second monitoring periodicity, and determine link health degree impact factors of the first link based on the link fault type of the first link and the link fault occurrence frequency of the first link, where the first link is any one of the links in the first candidate path.

In a possible implementation, the obtaining module 1101 is configured to obtain the network element health degrees of the network elements based on the network element health degree impact factors of the network elements and by using a first health degree algorithm, and obtain the link health degrees of the links based on the link health degree impact factors of the links and by using a second health degree algorithm.

In a possible implementation, the obtaining module 1101 is configured to obtain the network element health degrees of the network elements based on the network element health degree impact factors of the network elements and a first health degree model, and obtain the link health degrees of the links based on the link health degree impact factors of the links and a second health degree model.

In a possible implementation, the first health degree model and the second health degree model are AI models.

In a possible implementation, the obtaining module 1101 is configured to obtain a network element health degree statistical value based on health degree measurement results of the network element health degree impact factors of the first network element, and use the network element health degree statistical value as a network element health degree of the first network element, and obtain a link health degree statistical value based on health degree measurement results of the link health degree impact factors of the first link, and use the link health degree statistical value as a link health degree of the first link.

In a possible implementation, the obtaining module 1101 is configured to accumulate the health degree measurement results of the network element health degree impact factors of the first network element to obtain the network element health degree statistical value, and accumulate the health degree measurement results of the link health degree impact factors of the first link to obtain the link health degree statistical value.

In a possible implementation, the obtaining module 1101 is configured to accumulate products of the health degree measurement results of the network element health degree impact factors of the first network element and weights of the network element health degree impact factors, to obtain a first accumulation result, use a difference between a first health degree reference value and the first accumulation result as the network element health degree statistical value, accumulate products of the health degree measurement results of the link health degree impact factors of the first link and weights of the link health degree impact factors, to obtain a second accumulation result, and use a difference between a second health degree reference value and the second accumulation result as the link health degree statistical value.

In a possible implementation, the network element health data of the network elements is obtained based on at least one of alarms, logs, or KPI data of the network elements, and the link health data of the links is obtained based on at least one of alarms, logs, or KPI data of the links. Because the network element health data and the link health data can be obtained based on different records, manners of obtaining the network element health data and the link health data are flexible.

In a possible implementation, the network element health degree impact factors include a first fault type factor and a first fault probability factor, the link health degree impact factors include a second fault type factor and a second fault probability factor, the first fault probability factor includes at least one of accumulated fault duration, an accumulated fault quantity, or an average fault interval, and the second fault probability factor includes at least one of accumulated fault duration, an accumulated fault quantity, or an average fault interval.

In a possible implementation, the obtaining module 1101 is configured to use a health degree that is in the network element health degrees of the network elements and the link health degrees of the links and that meets a first condition as the path health degree of the first candidate path.

In a possible implementation, the determining module 1102 is configured to use the first candidate path as the target forwarding path if the path health degree of the first candidate path meets the health degree constraint information.

In a possible implementation, that the path health degree of the first candidate path meets the health degree constraint information includes the following. The path health degree of the first candidate path meets a second condition.

In a possible implementation, the apparatus further includes a sending module configured to send the target forwarding path to a second device, where the target forwarding path is used by the second device to forward service data, and/or a first updating module configured to monitor the path health degree of the target forwarding path, and update the target forwarding path based on the health degree constraint information if the path health degree does not meet the health degree constraint information.

In a possible implementation, the apparatus further includes a second updating module configured to receive a message for updating the forwarding path, where the message for updating the forwarding path indicates to update the target forwarding path.

In a possible implementation, the apparatus further includes a third updating module configured to update the target forwarding path based on a first time periodicity and the health degree constraint information.

In a possible implementation, the apparatus further includes a switching module configured to switch from the target forwarding path before the update to an updated target forwarding path according to MBB.

In a possible implementation, the constraint information further includes at least one of quality constraint information or cost constraint information, the quality constraint information is used to constrain quality of the determined forwarding path, and the cost constraint information is used to constrain a cost required for transmitting the service data through the determined forwarding path. The determining module 1102 is configured to determine the target forwarding path based on the at least one of the quality constraint information or the cost constraint information, the health degree constraint information, and the path health degree of the first candidate path.

Figure 12:
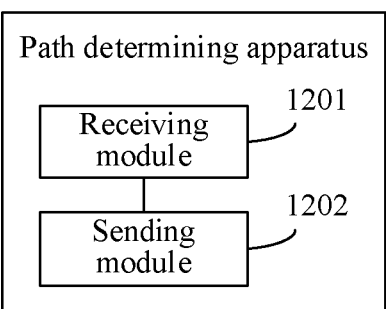
FIG. 12 is a schematic diagram of a structure of another path determining apparatus according to an embodiment of this application.

FIG. 12 is a schematic diagram of a structure of a path determining apparatus according to an embodiment of this application. The apparatus is used in a second device, and the second device is the second device shown in FIG. 3 and FIG. 4, and FIG. 7 to FIG. 10. Based on a plurality of following modules shown in FIG. 12, the path determining apparatus shown in FIG. 12 can perform all or some operations performed by the second device. It should be understood that the apparatus may include more additional modules than the shown modules or omit some of the shown modules. This is not limited in this embodiment of this application. As shown in FIG. 12, the apparatus includes a receiving module 1201 configured to receive a target forwarding path from a source network element to a destination network element, where the target forwarding path is determined based on constraint information and a path health degree of a first candidate path, and the first candidate path is a forwarding path from the source network element to the destination network element, and the path health degree of the first candidate path is obtained based on network element health degrees of network elements included in the first candidate path and link health degrees of links included in the first candidate path, the network element health degree is determined based on a network element fault type and a network element fault occurrence frequency within a first monitoring periodicity, the link health degree is determined based on a link fault type and a link fault occurrence frequency within a second monitoring periodicity, the constraint information includes health degree constraint information, the health degree constraint information indicates a condition that a path health degree of the target forwarding path needs to meet, and the path health degree of the target forwarding path indicates stability of the target forwarding path, and a sending module 1202 configured to forward service data based on the target forwarding path.

In a possible implementation, the apparatus further includes an updating module configured to receive an updated target forwarding path, and forward the service data based on the updated target forwarding path.

It should be understood that, when the apparatuses provided in FIG. 11 and FIG. 12 implement functions of the apparatuses, division into the foregoing functional modules is merely used as an example for description. In actual application, the foregoing functions may be allocated to different functional modules for implementation based on a requirement. In other words, an inner structure of a device is divided into different functional modules, to implement all or some of the functions described above. In addition, the apparatuses provided in the foregoing embodiments and the method embodiments pertain to the same concept. For a specific implementation process thereof, refer to the method embodiments. Details are not described herein again.

Figure 13:
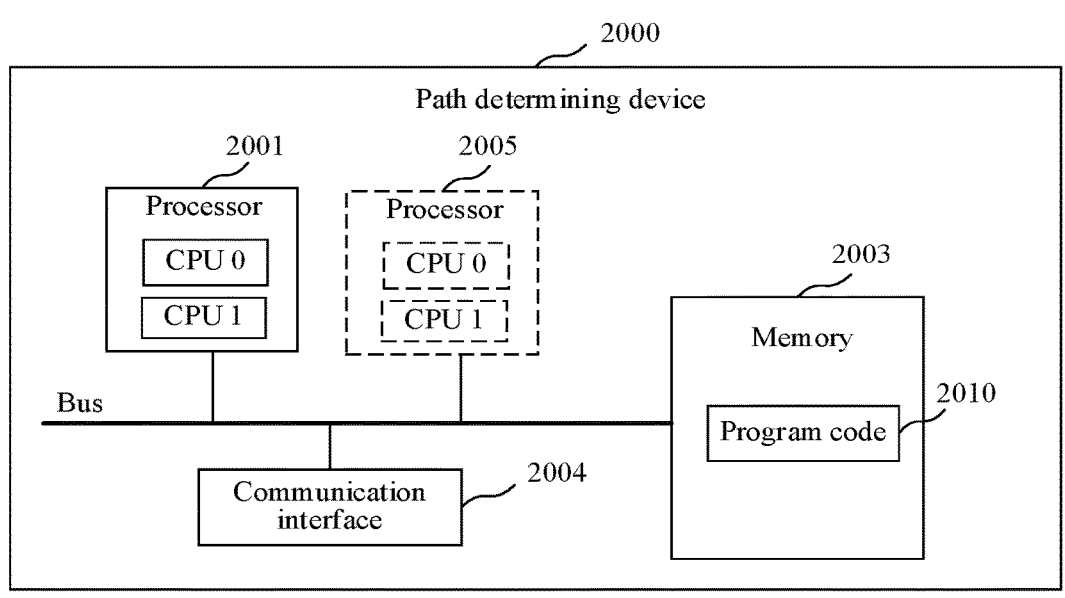
FIG. 13 is a schematic diagram of a structure of a path determining device according to an embodiment of this application.

FIG. 13 is a schematic diagram of a structure of a path determining device 2000 according to an example embodiment of this application. The path determining device 2000 shown in FIG. 13 is configured to perform operations related to the path determining method shown in FIG. 2 to FIG. 10. The path determining device 2000 is, for example, a switch or a router, and the path determining device 2000 may be implemented by using a general bus architecture.

As shown in FIG. 13, the path determining device 2000 includes at least one processor 2001, a memory 2003, and at least one communication interface 2004.

The processor 2001 is, for example, a general-purpose CPU, a digital signal processor (DSP), a network processor (NP), a graphics processing unit (GPU), a neural network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex PLD (CPLD), a field-programmable logic gate array (FPGA), a generic array logic (GAL), or any combination thereof. The processor may implement or execute various logical blocks, modules, and circuits described with reference to content disclosed in embodiments of the present disclosure. Alternatively, the processor may be a combination of processors implementing a computing function, for example, a combination of one or more microprocessors, or a combination of the DSP and a microprocessor.

Optionally, the path determining device 2000 further includes a bus. The bus is configured to transfer information between components of the path determining device 2000. The bus may be a Peripheral Component Interconnect (PCI) bus, an Extended Industry Standard Architecture (EISA) bus, or the like. The bus may be classified into an address bus, a data bus, a control bus, and the like. For case of representation, only one bold line is used to represent the bus in FIG. 13, but this does not mean that there is only one bus or only one type of bus.

The memory 2003 is, for example, a ROM or another type of static storage device that can store static information and instructions, or a random-access memory (RAM) or another type of dynamic storage device that can store information and instructions, or an electrically erasable programmable ROM (EEPROM), a compact disc (CD) ROM (CD-ROM) or another CD storage, an optical disc storage (including a compact disc, a laser disc, an optical disc, a DIGITAL VERSATILE DISC (DVD), a BLU-RAY disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 by using the bus. Alternatively, the memory 2003 may be integrated with the processor 2001.

The communication interface 2004 is any apparatus such as a transceiver, and is configured to communicate with another device or a communication network. The communication network may be the Ethernet, a radio access network (RAN), a wireless local area network (WLAN), or the like. The communication interface 2004 includes a wired communication interface, and may further include a wireless communication interface. Further, the communication interface 2004 may be an Ethernet interface, a fast Ethernet (FE) interface, a Gigabit Ethernet (GE) interface, an asynchronous transfer mode (ATM) interface, a WLAN interface, a cellular network communication interface, or a combination thereof. The Ethernet interface may be an optical interface, an electrical interface, or a combination thereof. In this embodiment of this application, the communication interface 2004 may be used by the path determining device 2000 to communicate with another device.

During specific implementation, in an embodiment, the processor 2001 may include one or more CPUs, such as a CPU 0 and a CPU 1 shown in FIG. 13. Each of the processors may be a single-core processor (single-CPU), or may be a multi-core processor (multi-CPU). The processor herein may be one or more devices, circuits, and/or processing cores configured to process data (for example, computer program instructions).

During specific implementation, in an embodiment, the path determining device 2000 may include a plurality of processors, such as a processor 2001 and a processor 2005 shown in FIG. 13. Each of the processors may be a single-core processor (single-CPU) or may be a multi-core processor (multi-CPU). The processor herein may refer to one or more devices, circuits, and/or processing cores configured to process data (such as computer program instructions).

During specific implementation, in an embodiment, the path determining device 2000 may further include an output device and an input device. The output device communicates with the processor 2001, and may display information in a plurality of manners. For example, the output device may be a liquid-crystal display (LCD), a light-emitting diode (LED) display device, a cathode-ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2010 for performing the solutions of this application, and the processor 2001 can execute the program code 2010 stored in the memory 2003. In other words, the path determining device 2000 may implement, by using the processor 2001 and the program code 2010 in the memory 2003, the path determining method provided in the method embodiment. The program code 2010 may include one or more software modules. Optionally, the processor 2001 may alternatively store program code or instructions for executing the solutions of this application.

In a specific embodiment, the path determining device 2000 in this embodiment of this application may correspond to the path determining device in the foregoing path determining method embodiments. The processor 2001 in the path determining device 2000 reads the instructions in the memory 2003, so that the path determining device 2000 shown in FIG. 13 can perform all or some operations performed by the path determining device.

The path determining device 2000 may further correspond to the path determining apparatus shown in FIG. 11 and FIG. 12, and each functional module in the path determining apparatus is implemented by using software of the path determining device 2000. In other words, the functional modules included in the path determining apparatus are generated after the processor 2001 of the path determining device 2000 reads the program code 2010 stored in the memory 2003.

The steps in the path determining method shown in FIG. 2 to FIG. 10 are completed by using an integrated logic circuit of hardware in the processor of the path determining device 2000, or by using instructions in a form of software. The steps in the method disclosed with reference to embodiments of this application may be directly performed by a hardware processor, or may be performed by using a combination of hardware in the processor and a software module. A software module may be located in a mature storage medium in the art, such as a random-access memory (RAM), a flash memory, a ROM, a programmable ROM (PROM), an EEPROM, or a register. The storage medium is located in the memory, and the processor reads information in the memory and performs the steps in the foregoing method in combination with the hardware in the processor. To avoid repetition, details are not described herein again.

Figure 14:
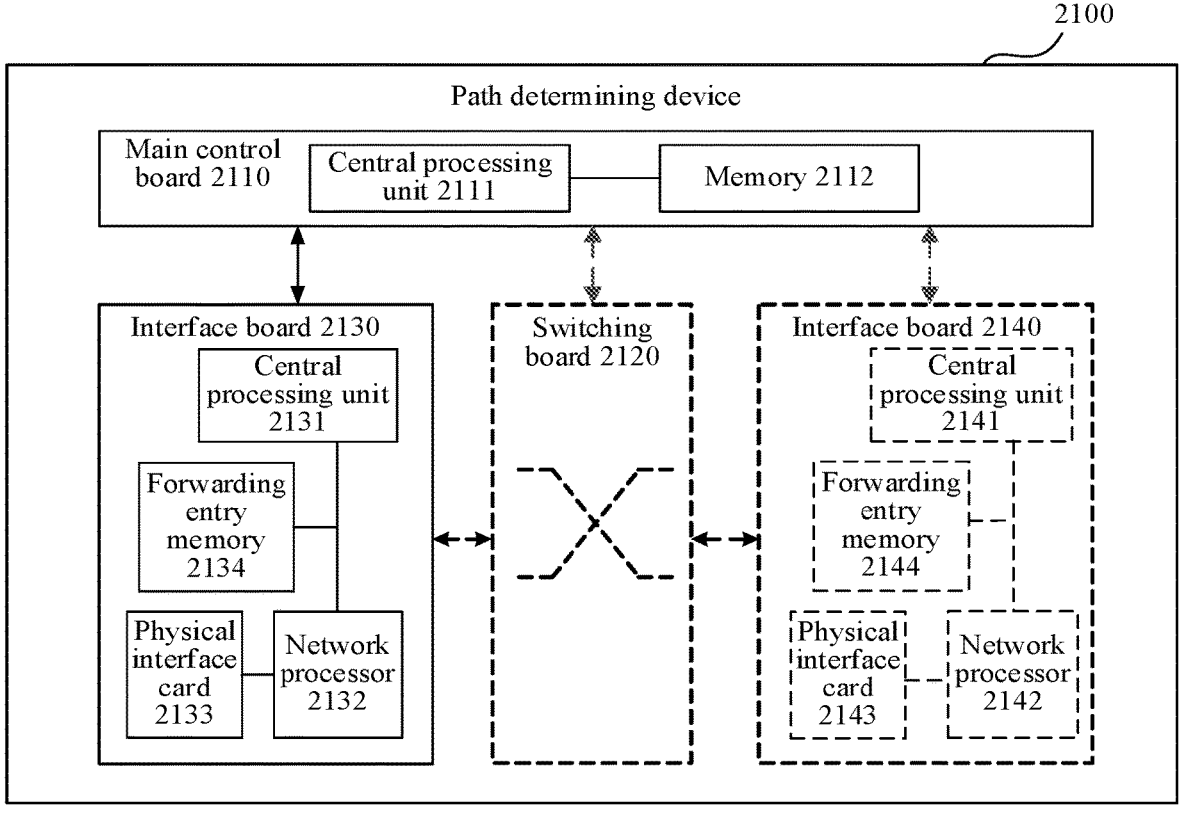
FIG. 14 is a schematic diagram of a structure of a path determining device according to an embodiment of this application.

FIG. 14 is a schematic diagram of a structure of a path determining device 2100 according to another example embodiment of this application. The path determining device 2100 shown in FIG. 14 is configured to perform all or some operations related to the path determining method shown in FIG. 2 to FIG. 10. The path determining device 2100 is, for example, a switch or a router, and the path determining device 2100 may be implemented by using a general bus architecture.

As shown in FIG. 14, the path determining device 2100 includes a main control board 2110 and an interface board 2130.

The main control board is also referred to as a main processing unit (MPU) or a route processing card. The main control board 2110 is configured to control and manage components in the path determining device 2100, including functions of route computation, device management, device maintenance, and protocol processing. The main control board 2110 includes a central processing unit 2111 and a memory 2112.

The interface board 2130 is also referred to as a line processing unit (LPU), a line card, or a service board. The interface board 2130 is configured to provide various service interfaces, and forward a data packet. The service interface includes but is not limited to an Ethernet interface, a packet over Synchronous Optical Networking (SONET)/Synchronous Digital Hierarchy (SDH) (POS) interface, and the like. The Ethernet interface is, for example, a flexible Ethernet (FlexE) service interface (or FlexE client). The interface board 2130 includes a central processing unit 2131, a network processor 2132, a forwarding entry memory 2134, and a physical interface card (PIC) 2133.

The central processing unit 2131 on the interface board 2130 is configured to control and manage the interface board 2130 and communicate with the central processing unit 2111 on the main control board 2110.

The network processor 2132 is configured to forward a packet. A form of the network processor 2132 may be a forwarding chip. The forwarding chip may be a network processor (NP). In some embodiments, the forwarding chip may be implemented by using an ASIC or an FPGA. Further, the network processor 2132 is configured to forward a received packet based on a forwarding table stored in the forwarding entry memory 2134. If a destination address of the packet is an address of the path determining device 2100, the network processor sends the packet to a CPU (for example, the central processing unit 2131) for processing. If the destination address of the packet is not the address of the path determining device 2100, the network processor searches, based on the destination address, the forwarding table for a next hop and an outbound interface corresponding to the destination address, and forwards the packet to the outbound interface corresponding to the destination address. Processing of an uplink packet may include processing of a packet ingress interface and forwarding table searching. Processing of a downlink packet may include forwarding table searching, and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be installed on the interface board 2130, and is responsible for converting an optical/electrical signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

For example, the path determining device 2100 includes a plurality of interface boards. For example, the path determining device 2100 further includes an interface board 2140. The interface board 2140 includes a central processing unit 2141, a network processor 2142, a forwarding entry memory 2144, and a physical interface card 2143. Functions and implementations of components in the interface board 2140 are the same as or similar to those in the interface board 2130. Details are not described herein again.

For example, the path determining device 2100 further includes a switching board 2120. The switching board 2120 may also be referred to as a switch fabric unit (SFU). When the path determining device has a plurality of interface boards, the switching board 2120 is configured to complete data exchange between the interface boards. For example, the interface board 2130 and the interface board 2140 may communicate with each other via the switching board 2120.

The main control board 2110 is coupled to the interface board. For example, the main control board 2110, the interface board 2130, the interface board 2140, and the switching board 2120 are connected to a system backboard via a system bus for interworking. In a possible implementation, an inter-process communication (IPC) protocol channel is established between the main control board 2110, the interface board 2130, and the interface board 2140, and the main control board 2110, the interface board 2130, and the interface board 2140 communicate with each other through the IPC channel.

Logically, the path determining device 2100 includes a control plane and a forwarding plane. The control plane includes the main control board 2110 and the central processing unit 2111. The forwarding plane includes components that perform forwarding, such as the forwarding entry memory 2134, the physical interface card 2133, and the network processor 2132. The control plane performs the following functions: a function of a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be completely separated, and are not on a same network device.

It should be noted that, there may be one or more main control boards. When there is a plurality of main control boards, the main control boards may include a primary main control board and a secondary main control board. There may be one or more interface boards. A stronger data processing capability of the path determining device indicates a larger quantity of provided interface boards. There may also be one or more physical interface cards on the interface board. There may be no switching board or one or more switching boards. When there is a plurality of switching boards, load balancing and redundancy backup may be implemented together. In a centralized forwarding architecture, the path determining device may not need the switching board, and the interface board provides a function of processing service data of an entire system. In a distributed forwarding architecture, the path determining device may have at least one switching board, and data exchange between a plurality of interface boards is implemented by using the switching board, to provide a large-capacity data exchange and processing capability. Therefore, a data access and processing capability of the path determining device in the distributed architecture is better than that of the path determining device in the centralized architecture. For example, the path determining device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained by combining the two central processing units. The path determining device in this form (for example, a network device such as a low-end switch or router) has a weak data exchange and processing capability. A specific architecture that is to be used depends on a specific networking deployment scenario. This is not limited herein.

In a specific embodiment, the path determining device 2100 corresponds to the path determining apparatus that is used in a first device and that is shown in FIG. 11. In some embodiments, an obtaining module 1101 in the path determining apparatus shown in FIG. 11 is equivalent to the physical interface card 2133 in the path determining device 2100. A determining module 1102 is equivalent to the central processing unit 2111 or the network processor 2132 in the path determining device 2100.

In some embodiments, the path determining device 2100 further corresponds to the path determining apparatus that is used in a second device and that is shown in FIG. 12. In some embodiments, a receiving module 1201 in the path determining apparatus shown in FIG. 12 is equivalent to the physical interface card 2133 in the path determining device 2100. A sending module 1202 is equivalent to the central processing unit 2111 or the network processor 2132 in the path determining device 2100.

Based on the path determining devices shown in FIG. 13 and FIG. 14, an embodiment of this application further provides a path determining system. The system includes a first device and a second device. Optionally, the first device is the path determining device 2000 shown in FIG. 13 or the path determining device 2100 shown in FIG. 14, and the second device is the path determining device 2000 shown in FIG. 13 or the path determining device 2100 shown in FIG. 14.

For a path determining method performed by the path determining device, refer to related descriptions in the embodiments shown in FIG. 2 to FIG. 10. Details are not described herein again.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform a path determining method that needs to be performed by a control device.

An embodiment of this application further provides a communication apparatus. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. In addition, when the processor executes the instructions stored in the memory, the processor is enabled to perform a path determining method that needs to be performed via a display interface.

It should be understood that, the processor may be a CPU, or may be another general-purpose processor, a DSP, an ASIC, an FPGA or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing (RISC) machines (ARM) architecture.

Further, in an optional embodiment, the memory may include a ROM and a RAM, and provide instructions and data for the processor. The memory may further include a nonvolatile RAM. For example, the memory may further store information about a device type.

The memory may be a volatile memory or a nonvolatile memory, or may include both a volatile memory and a nonvolatile memory. The nonvolatile memory may be a ROM, a PROM, an erasable PROM (EPROM), an EEPROM, or a flash memory. The volatile memory may be a RAM, used as an external cache. By way of example, and not limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous-link (synchlink) DRAM (SLDRAM), and a direct rambus (DR) RAM.

An embodiment of this application further provides a computer-readable storage medium. The storage medium stores at least one instruction, and the instruction is loaded and executed by a processor to implement any one of the foregoing path determining methods.

An embodiment of this application further provides a computer program product. When the computer program is executed by a computer, a processor or the computer may perform corresponding steps and/or procedures in the path determining methods in the foregoing method embodiment.

An embodiment of this application further provides a chip, including a processor configured to invoke, from a memory, instructions stored in the memory and run the instructions, to enable a communication device on which the chip is installed to perform the path determining methods in the foregoing aspects.

An embodiment of this application further provides another chip, including an input interface, an output interface, a processor, and a memory. The input interface, the output interface, the processor, and the memory are connected through an internal connection path. The processor is configured to execute code in the memory. When the code is executed, the processor is configured to perform the path determining methods in the foregoing aspects.

All or some of the foregoing embodiments may be implemented by software, hardware, firmware, or any combination thereof. When software is used to implement the embodiments, all or some of embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may be aware that, with reference to the examples described in embodiments disclosed in this specification, method steps and modules can be implemented by software, hardware, firmware, or any combination thereof. To clearly describe the interchangeability between the hardware and the software, the foregoing has generally described steps and composition of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by hardware or a program instructing related hardware. The program may be stored in a computer-readable storage medium. The storage medium may include a read-only memory, a magnetic disk, or an optical disc.

When software is used to implement the embodiments, all or some of embodiments may be implemented in a form of a computer program product. The computer program product includes one or more computer program instructions. For example, the method in embodiments of this application may be described in a context of a machine-executable instruction. The machine-executable instruction is, for example, a program module executed in a device included in a real or virtual processor of a target. Usually, the program module includes a routine, a program, a library, an object, a class, a component, a data structure, and the like, and executes a specific task or implements a specific abstract data structure. In various embodiments, functions of the program modules may be combined or split between the described program modules. The machine-executable instruction for the program module may be executed locally or within a distributed device. In the distributed device, the program module may be located in both a local storage medium and a remote storage medium.

Computer program code used to implement the method in the embodiments of this application may be written in one or more programming languages. The computer program code may be provided for a processor of a general-purpose computer, a dedicated computer, or another programmable data processing apparatus, so that when the program code is executed by the computer or the other programmable data processing apparatus, functions/operations specified in the flowcharts and/or block diagrams are implemented. The program code may be executed completely on a computer, partially on a computer, as an independent software package, partially on a computer and partially on a remote computer, or completely on a remote computer or server.

In a context of embodiments of this application, the computer program code or related data may be carried by any appropriate carrier, so that a device, an apparatus, or a processor can perform various processing and operations described above. For example, the carrier includes a signal, a computer-readable medium, and the like.

For example, the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a RAM, a ROM, an EPROM or flash memory, an optical storage device, a magnetic storage device, or any appropriate combination thereof.

It may be clearly understood by a person skilled in the art that, for the purpose of convenient and brief description, for a detailed working process of the foregoing system, device, and module, refer to a corresponding process in the foregoing method embodiment. Details are not described herein.

In the several embodiments provided in this application, it should be understood that the disclosed system, device, and method may be implemented in other manners. For example, the described device embodiment is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces, and the indirect couplings or communication connections between the devices or modules may be electrical connections, mechanical connections, or connections in other forms.

The modules described as separate components may or may not be physically separate, and components displayed as modules may or may not be physical modules, may be located in one location, or may be distributed on a plurality of network modules. Some or all of the modules may be selected based on an actual requirement to achieve the objectives of the solutions of embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of the software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The foregoing storage medium includes any medium that can store program code, such as a Universal Serial Bus (USB) flash drive, a removable hard disk, a ROM, a RAM, a magnetic disk, or an optical disc.

In this application, the terms such as "first" and "second" are used to distinguish between same or similar items that have basically same effects and functions. It should be understood that there is no logical or time sequence dependency between "first", "second", and "n$^{th}$", and a quantity and an execution sequence are not limited, either. It should also be understood that although the terms such as "first" and "second" are used in the following description to describe various elements, these elements should not be limited by the terms. These terms are merely used to distinguish one element from another element.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

The term "at least one" in this application means one or more, and the term "a plurality of" in this application means two or more. For example, a plurality of second devices mean two or more second devices. The terms "system" and "network" are often used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of the various examples and the appended claims are also intended to include plural forms, unless otherwise specified in the context clearly.

It should be further understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: only A exists, both A and B exist, and only B exists. In addition, the character "/" in this application usually indicates an "or" relationship between associated objects.

It should be further understood that the term "include" (or "includes", "including", "comprises", and/or "comprising"), when being used in this specification, specifics the presence of stated features, integers, steps, operations, elements, and/or components, but does not preclude the presence or addition of one or more other features, integers, steps, operations, elements, components, and/or groups thereof.

It should be further understood that the term "if" may be interpreted as a meaning of "when" ("upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based only on A, and B may alternatively be determined based on A and/or other information.

It should further be understood that "one embodiment", "an embodiment", or "a possible implementation" mentioned throughout this specification means that particular features, structures, or characteristics related to the embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

The foregoing descriptions are merely optional embodiments of this application, but are not intended to limit this application. Any modification, equivalent replacement, or improvement made without departing from the principle of this application shall fall within the protection scope of this application.

What is claimed is:

1. A method implemented by a first apparatus comprising one or more processors and one or more memories storing instructions, wherein the method comprises:
obtaining a first path health degree of a first candidate path based on network element health degrees of network elements comprised in the first candidate path and link health degrees of links comprised in the first candidate path, wherein the first candidate path is a forwarding path from a source network element to a destination network element, wherein each of the network element health degrees is based on a first network element fault type and a first network element fault occurrence frequency within a first monitoring periodicity, and wherein each of the link health degrees is based on a first link fault type and a first link fault occurrence frequency within a second monitoring periodicity, wherein obtaining the first path health degree further comprises:
obtaining network element health data of the network elements within the first monitoring periodicity, wherein the network element health data indicates network element fault information; and
obtaining link health data of the links within the second monitoring periodicity, wherein the link health data indicates link fault information, wherein obtaining the network element health degrees comprises:
determining network element health degree impact factors of the network elements based on the network element health data; and
obtaining the network element health degrees based on the network element health degree impact factors,
wherein obtaining the link health degrees comprises:
determining link health degree impact factors of the links based on the link health data; and
obtaining the link health degrees based on the link health degree impact factors; and
determining a target forwarding path based on constraint information and the first path health degree,
wherein the constraint information comprises health degree constraint information indicating a condition that a second path health degree of the target forwarding path is to meet, and
wherein the second path health degree indicates stability of the target forwarding path.
2. The method of claim 1, further comprising:
further obtaining the network element health data based on at least one of first alarms of the network elements, first logs of the network elements, or first key performance indicator (KPI) data of the network elements; and
further obtaining the link health data based on at least one of second alarms of the links, second logs of the links, or second KPI data of the links.
3. The method of claim 1, further comprising setting a health degree that is in the network element health degrees and the link health degrees and that meets a first condition as the first path health degree.
4. The method of claim 1, wherein the network element health degree impact factors comprise:
a first fault type factor; and a first fault probability factor comprising at least one of a first accumulated fault duration, a first accumulated fault quantity, or a first average fault interval, and wherein the link health degree impact factors comprise:

a second fault type factor; and a second fault probability factor comprising at least one of a second accumulated fault duration, a second accumulated fault quantity, or a second average fault interval.

5. The method of claim 1, wherein obtaining the network element health degrees comprises obtaining the network element health degrees using a first health degree algorithm, and wherein obtaining the link health degrees comprises obtaining the link health degrees using a second health degree algorithm.

6. The method of claim 1, wherein obtaining the network element health degrees comprises further obtaining the network element health degrees based on a first health degree model, and wherein obtaining the link health degrees comprises further obtaining the link health degrees based on a second health degree model.

7. The method of claim 1, wherein determining the network element health degree impact factors comprises:

obtaining a second network element fault type of a first network element and a second network element fault occurrence frequency of the first network element based on second network element health data of the first network element within the first monitoring periodicity, wherein the first network element is any one of the network elements; and determining second network element health degree impact factors of the first network element based on the second network element fault type and the second network element fault occurrence frequency, and wherein determining the link health degree impact factors comprises:

obtaining a second link fault type of a first link and a second link fault occurrence frequency of the first link based on second link health data of the first link within the second monitoring periodicity; and determining second link health degree impact factors of the first link based on the second link fault type and the second link fault occurrence frequency, wherein the first link is any one of the links.

8. The method of claim 7, wherein obtaining the network element health degrees comprises obtaining the network element health degrees based on a first health degree model, and wherein obtaining the link health degrees comprises obtaining the link health degrees based on a second health degree model.

9. The method of claim 7, wherein obtaining the network element health degrees comprises obtaining the network element health degrees using a first health degree algorithm, and wherein obtaining the link health degrees comprises obtaining the link health degrees using a second health degree algorithm.

10. The method of claim 9, wherein obtaining the network element health degrees further comprises:

obtaining a network element health degree statistical value based on first health degree measurement results of the network element health degree impact factors; and setting the network element health degree statistical value as a second network element health degree of the first network element, and wherein obtaining the link health degrees further comprises:

obtaining a link health degree statistical value based on second health degree measurement results of the link health degree impact factors; and setting the link health degree statistical value as a second link health degree of the first link.

11. The method of claim 10, wherein obtaining the network element health degree statistical value comprises accumulating the first health degree measurement results to obtain the network element health degree statistical value, and wherein obtaining the link health degree statistical value comprises accumulating the second health degree measurement results to obtain the link health degree statistical value.

12. The method of claim 10, further comprising:

accumulating first products of the first health degree measurement results and first weights of the network element health degree impact factors to obtain a first accumulation result;

setting a first difference between a first health degree reference value and the first accumulation result as the network element health degree statistical value;

accumulating second products of the second health degree measurement results and second weights of the link health degree impact factors to obtain a second accumulation result; and setting a second difference between a second health degree reference value and the second accumulation result as the link health degree statistical value.

13. The method of claim 1, further comprising:

identifying that the first path health degree meets the health degree constraint information; and setting, in response to identifying that the first path health degree meets the health degree constraint information, the first candidate path as the target forwarding path.

14. The method of claim 1, wherein after determining the target forwarding path, the method further comprises sending the target forwarding path to a second apparatus to enable the second apparatus to forward service data.

15. The method of claim 1, wherein after determining the target forwarding path, the method further comprises:

monitoring the second path health degree; and updating the target forwarding path based on the health degree constraint information when the second path health degree does not meet the health degree constraint information.

16. An apparatus comprising:

one or more memories configured to store instructions; and one or more processors coupled to the one or more memories and configured to execute the instructions to cause the apparatus to:

obtain a first path health degree of a first candidate path based on network element health degrees of network elements comprised in the first candidate path and link health degrees of links comprised in the first candidate path, wherein the first candidate path is a forwarding path from a source network element to a destination network element, wherein each of the network element health degrees is based on a network element fault type and a network element fault occurrence frequency within a first monitoring periodicity, and wherein each of the link health degrees is based on a link fault type and a link fault occurrence frequency within a second monitoring periodicity, wherein the one or more processors is further configured to obtain the first path health degree by:

obtaining network element health data of the network elements within the first monitoring periodicity, wherein the network element health data indicates network element fault information; and obtaining link health data of the links within a second monitoring periodicity, wherein the link health data indicates link fault information, wherein the one or more processors is further configured to obtain the network element health degrees by:

determining network element health degree impact factors of the network elements based on the network element health data; and obtaining the network element health degrees based on the network element health degree impact factors, wherein the one or more processors is further configured to obtain the link health degrees by:

determining link health degree impact factors of the links based on the link health data; and obtaining the link health degrees based on the link health degree impact factors; and determine a target forwarding path based on constraint information and the first path health degree, wherein the constraint information comprises health degree constraint information indicating a condition that a second path health degree of the target forwarding path is to meet, and wherein the second path health degree indicates stability of the target forwarding path.

17. The apparatus of claim 16, wherein the one or more processors are further configured to execute the instructions to cause the apparatus to:

further obtain the network element health data based on at least one of first alarms of the network elements, first logs of the network elements, or first key performance indicator (KPI) data of the network elements; and further obtain the link health data based on at least one of second alarms of the links, second logs of the links, or second KPI data of the links.

18. A path determining system comprising:

a first apparatus comprising:

one or more memories configured to store instructions; and one or more processors coupled to the one or more memories and configured to execute the instructions to cause the first apparatus to:

obtain a first path health degree of a first candidate path based on network element health degrees of network elements comprised in the first candidate path and link health degrees of links comprised in the first candidate path, wherein the first candidate path is a forwarding path from a source network element to a destination network element, wherein each of the network element health degrees is based on a network element fault type and a network element fault occurrence frequency within a first monitoring periodicity, and wherein each of the link health degrees is based on a link fault type and a link fault occurrence frequency within a second monitoring periodicity, wherein obtaining the first path health degree further comprises:

obtaining network element health data of the network elements within the first monitoring periodicity, wherein the network element health data indicates network element fault information; and obtaining link health data of the links within the second monitoring periodicity, wherein the link health data indicates link fault information, wherein obtaining the network element health degrees comprises:

determining network element health degree impact factors of the network elements based on the network element health data; and obtaining the network element health degrees based on the network element health degree impact factors, wherein obtaining the link health degrees comprises:

determining link health degree impact factors of the links based on the link health data; and obtaining the link health degrees based on the link health degree impact factors;

determine a target forwarding path based on constraint information and the first path health degree, wherein the constraint information comprises health degree constraint information indicating a condition that a second path health degree of the target forwarding path is to meet, and wherein the second path health degree indicates stability of the target forwarding path; and send the target forwarding path; and a second apparatus communicatively coupled to the first apparatus and configured to receive the target forwarding path from the first apparatus.

19. The path determining system of claim 18, wherein the one or more processors is further configured to execute the instructions to cause the first apparatus to:

further obtain the network element health data based on at least one of first alarms of the network elements, first logs of the network elements, or first key performance indicator (KPI) data of the network elements; and further obtain the link health data based on at least one of second alarms of the links, second logs of the links, or second KPI data of the links.

20. The path determining system of claim 18, wherein the one or more processors is further configured to execute the instructions to cause the first apparatus to set a health degree that is in the network element health degrees and the link health degrees and that meets a first condition as the first path health degree.

* * * * *